(12) United States Patent
Hwang et al.

(10) Patent No.: US 10,880,047 B2
(45) Date of Patent: Dec. 29, 2020

(54) SYSTEMS, METHODS AND DEVICES FOR LINK ADAPTATION AND REDUCING HYBRID AUTOMATIC REPEAT REQUEST OVERHEAD

(71) Applicant: INTEL IP CORPORATION, Santa Clara, CA (US)

(72) Inventors: Yeong-Sun Hwang, Oberhaching (DE); Holger Neuhaus, Munich (DE); Huaning Niu, San Jose, CA (US); Wenting Chang, Beijing (CN); Sabine Roessel, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 145 days.

(21) Appl. No.: 16/093,198

(22) PCT Filed: Jun. 23, 2016

(86) PCT No.: PCT/US2016/039066
§ 371 (c)(1),
(2) Date: Oct. 12, 2018

(87) PCT Pub. No.: WO2017/222534
PCT Pub. Date: Dec. 28, 2017

(65) Prior Publication Data
US 2019/0132089 A1 May 2, 2019

(51) Int. Cl.
*H04L 1/18* (2006.01)
*H04L 1/00* (2006.01)
*H04L 1/20* (2006.01)

(52) U.S. Cl.
CPC .......... *H04L 1/1812* (2013.01); *H04L 1/0007* (2013.01); *H04L 1/1825* (2013.01);
(Continued)

(58) Field of Classification Search
CPC ..................................................... H04L 1/1812
(Continued)

(56) References Cited

U.S. PATENT DOCUMENTS

| 2010/0265903 | A1 | 10/2010 | Maheshwari | |
| 2017/0142666 | A1* | 5/2017 | Shimezawa | H04W 52/325 |
| 2017/0230843 | A1* | 8/2017 | Ouchi | H04B 7/063 |

OTHER PUBLICATIONS

LG Electronics, "Updated offline discussion summary on V2X evaluation assumptions", R1-154981, 3GPP TSG RAN WG1 Meeting #82, Beijing, China, Agenda Item 7.2.8.1, Aug. 24-28, 2015, 6 pages.
(Continued)

*Primary Examiner* — Fritz Alphonse
(74) *Attorney, Agent, or Firm* — Alliance IP, LLC

(57) ABSTRACT

An apparatus, a system and a method use a class of dynamic switching mechanisms with multiple HARQ block sizes to reduce HARQ retransmission overhead while limiting the increase of HARQ ACK feedback overhead. The apparatus includes a first processing unit configured to estimate an intra-subframe fluctuation level of per-codeblock errors; a second processing unit configured to: map the intra-subframe fluctuation level to a hybrid automatic repeat request (HARQ) block size; determine a HARQ acknowledgement (ACK) format based at least in part on the HARQ block size; indicate the selected HARQ block size to a data transmitter; and generate a HARQ ACK. Per-code block link adaptation can be used to support multiple MCSs for a single user in each subframe with fine time-frequency granularity, with low-bandwidth signaling overhead and without a complete dependency on reference signal (RS) structure.

26 Claims, 15 Drawing Sheets

(52) U.S. Cl.
CPC .......... *H04L 1/1861* (2013.01); *H04L 1/1864* (2013.01); *H04L 1/20* (2013.01); *H04L 1/203* (2013.01)

(58) Field of Classification Search
USPC ........................................ 714/704, 707, 709
See application file for complete search history.

(56) References Cited

OTHER PUBLICATIONS

Nokia, et al., "On Hybrid ARQ functionality for 5G", R1-165373, 3GPPD TSG-RAN WG1 #85, Nanjing, P.R. China, Agenda Item 7.1.7, May 23-27, 2016, 3 pages.
PCT/US2016/039066, International Search Report and Written Opinion, dated Apr. 7, 2017, 21 pages.

* cited by examiner

SYSTEMS, METHODS AND DEVICES FOR LINK ADAPTATION AND REDUCING HYBRID AUTOMATIC REPEAT REQUEST OVERHEAD

RELATED APPLICATIONS

This application is a national stage filing under U.S.C. § 371 of International Patent Application No. PCT/US2016/039066, filed Jun. 23, 2016, which is hereby incorporated by reference herein in its entirety.

TECHNICAL FIELD

The present disclosure relates to link-quality adjustments and more specifically relates to dynamic modulation and coding scheme adjustments and dynamic hybrid automatic repeat request adjustments.

DETAILED DESCRIPTION

Figure 1:
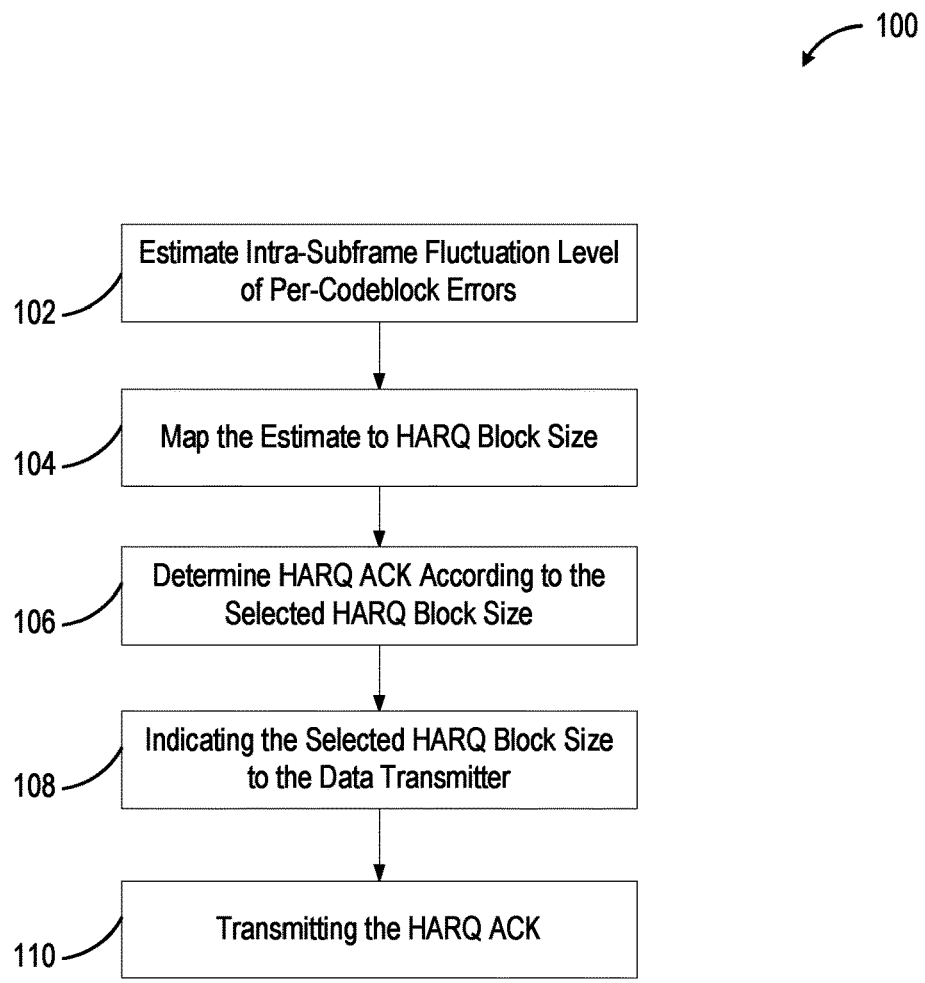
FIG. 1 is a flow chart illustrating a method of dynamic hybrid automatic repeat request (HARQ) block size switching consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable (I) a class of dynamic switching mechanisms among multiple HARQ block sizes with the aim of reducing HARQ retransmission overhead while limiting the increase of HARQ ACK feedback overhead and (II) per-code block link adaptation that supports multiple modulation and coding schemes (MCSs) for a single user in each subframe with fine time-frequency granularity, without a dependency on reference signal (RS) structure, and low-bandwidth signaling overhead.

Techniques, apparatus and methods are disclosed that enable (I) a class of dynamic switching mechanisms among multiple HARQ block sizes with the aim of reducing HARQ retransmission overhead while limiting the increase of HARQ ACK feedback overhead. Depending on an embodiment, two approaches are described that can be used with respect to feedback overhead—(1) dynamically adapting feedback overhead, and (2) keeping a stable feedback overhead to introduce useful side information when less HARQ ACK is useful. For (1) dynamically adapting feedback overhead, dynamic switching may be based on the fluctuating occurrence of per-code block errors within a TTI (transmission time interval), a.k.a. subframe, where such intra-subframe error fluctuation is denoted hereafter as "error micro fluctuation." For (2) keeping a stable feedback overhead to introduce useful side information, intra-subframe fluctuation of additional metrics, e.g., spectral efficiency, can also be considered for the switching.

These communication systems can employ multiple distinct HARQ block size candidates and dynamic switching between the multiple candidates over time, where the switching may be done once per a subframe or a group of subframes. The switching may be periodic or aperiodic, it may be applied in downlink or uplink, and it may be done by the UE or the network.

For example, the systems can support dynamic selection of HARQ block size and HARQ ACK size, based on intra-subframe error fluctuation. This selection can be UE-driven, based on code block (CB) error detection results. The selection can be network-driven, based on its knowledge of serving and interferer traffics. The system can enable dynamic mode selection between smaller (sub-TTI) HARQ block size and smaller (sub-TTI) allocation size for distinct MCS (modulation and coding scheme). This selection can be based on code block error detection results and code block spectral efficiency estimates.

In some embodiments, a challenge of reducing HARQ retransmission overhead can include keeping HARQ ACK feedback efficient in a communication system. This balance can be relevant to high data-rate systems such as 5G (fifth generation wireless systems) where a TTI can contain large data payload, and thus the maximum HARQ retransmission can be large.

Techniques, apparatus and methods are disclosed that enable (II) a transmitter side MCS configuration and adjustment per code block (CB) or a group of CBs based on receiver side feedback reporting per CB or a group of CBs without additional reference signals utilizing a configurable reporting and adjustment mechanism based on quantized reporting and adjustment schemes using very low control signaling bandwidth. This process can enable an efficient way to increase throughput in scenarios with significant received signal quality difference among CBs.

For example, a receiver provides a set of configurable measurement methods with very low output resolution (e.g., one bit per CB). A transmitter preconfigures a measurement method to be used by the receiver via a low bandwidth control signaling interface (such as a higher layer communication channel). The receiver determines for each reporting interval the measurement results. The receiver feeds back the measurement results to the transmitter. The transmitter adjusts the MCS for each CB based on the measurements, where the MCS for a CB may be independent of the MCS for any other CB.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

High data-rate systems with large bandwidth and high modulation orders may support a large number of code blocks in a single subframe. A code block is a block of signals that maps to a channel encoding instance and is associated with a cyclic redundancy check (CRC). Many communication systems limit the maximum code block size to make it amenable to channel coding and interleaving, and in high data-rate systems this can lead to many code blocks in a subframe. This is even more so in low-latency systems such as 5G, where decoding timing constraints may dictate a code block to occupy a small time interval within a subframe. In the context of an example self-contained orthogonal frequency division multiplexing (OFDM) system where the data and the corresponding HARQ ACK feedback are contained within the same subframe, a code block may be constrained to occupy no more than a single OFDM symbol.

In some systems, a UL control signal contains ACK/NACK information indicating successful or failed data reception for the entire TB (i.e., a single bit indicates success or failure of the CBs in a TB). In order to prevent data loss, a TB decoding failure is indicated if decoding any of the associated CBs has failed, even though most of the CBs might have been received successfully. The UL control signal may also contain a regular CSI report with detailed information for link adaptation. This feedback can be reported with a delay of a non-zero number of subframes and with TB granularity.

This presence of many code blocks in a subframe that holds large data means that a trade-off between HARQ retransmission overhead and HARQ ACK feedback overhead can be achieved by defining smaller HARQ block sizes, where the smaller HARQ block comprises one or more but not all code blocks in the subframe. The example self-contained OFDM system may map an integer number of code blocks to each OFDM symbol, so that an OFDM symbol is a natural candidate for the HARQ block size. Such smaller HARQ block size reduces retransmission overhead when some received code blocks contain errors while others do not. The trade-off cost is a larger HARQ ACK feedback field.

The degree of the retransmission overhead reduction achievable with such smaller HARQ blocks depends on how fluctuating the occurrence of per-code block errors is within a subframe, where such fluctuation is referred to herein as "error micro fluctuation." The higher the fluctuation, the more likely some but not all of the received code blocks within a subframe contain errors, and the more attractive the smaller HARQ block becomes with respect to the larger feedback cost. This error micro fluctuation may be due to selective channel and/or selective interference. In the context of low-latency and high-fidelity 5G systems, short subframes and beamforming reduce time- and frequency-selectivity of the channel, thus selective interference may be the more dominant source of the error micro fluctuation. In particular, intra-subframe fluctuation of interfering data signal level may arise, if a base station time-division-multiplexes user traffics within a subframe to meet latency restrictions and to effectively utilize a limited number of simultaneous beam directions.

Some embodiments of communication systems such as 3GPP LTE systems can use the HARQ ACK bundling mechanism, whereby a logical AND of multiple ACK is taken and sent. These multiple ACKs may correspond to multiple component carriers in a carrier-aggregation scheme, multiple subframes in a time division duplex (TDD) configuration with asymmetric uplink-downlink (UL-DL), or multiple transport blocks in a multiple-input multiple-output (MIMO) transmission mode. These HARQ ACK bundling methods do not offer adaptive platforms for reducing retransmission overhead. They are configuration-based, semi-static, and network-centric, and focus on limiting the HARQ feedback overhead at the cost of larger retransmission overhead.

The embodiments described below, in contrast, offer adaptive platforms for reducing retransmission overhead. Balancing retransmission overhead with the feedback overhead can be based on estimates of error micro fluctuation. The methods can be configuration-based or blind, semi-static or dynamic, and network-centric or device-centric. Two classes of methods in particular are supported; a first class of direct balancing via dynamic switching of HARQ block size, and a second class of indirect balancing via dynamic switching between a sub-TTI HARQ block mode and a sub-TTI MCS assignment mode.

The first class may be adopted if variation in the total control overhead including the feedback gives realizable advantage. The switching may be based on the degree of error micro fluctuation.

The second class may be adopted if the total control overhead is fixed or its variation does not bring benefit. The switching may be between a smaller HARQ block size (larger ACK field) with coarser MCS assignment and a larger HARQ block size (smaller ACK field) with finer MCS assignment, whereby the finer MCS allocation is enabled by side information filling the space freed up with the smaller ACK field. In this case, the switching may be based on multiple factors, including the error micro fluctuation, fluctuation of per-code block spectral efficiency within a TTI (denoted hereafter as capacity micro fluctuation), as well as how the capacity micro fluctuation pattern changes on a longer time-scale, e.g., over subframes (denoted hereafter as capacity macro fluctuation). The term capacity is used herein for brevity, and is intended to mean spectral efficiency in the context of fixed MCS levels.

The class of sub-TTI HARQ block assignment schemes is denoted herein as "micro-ACK" and the class of sub-TTI MCS assignment schemes as "micro-MCS." A signal block to which a single MCS is assigned is an MCS block.

Link adaptation is a mechanism used in a wide range of communication systems, whereby channel state information (CSI) estimated at the receiver is fed back to the transmitter and is used to modify the transmit signal for a more reliable communication. This CSI represents the received signal quality at a subframe, and it takes a format agreed between the transmitter and the receiver.

A channel quality indicator (CQI) is a link adaptation format that indicates a preferred combination of modulation order and channel coding rate, i.e., MCS. With the CQI from the receiver, the transmitter adapts the MCS to time-varying channel conditions, aiming to achieve higher throughput than that is possible without CQI. If the CQI is too conservative, the associated MCS is inefficient, and the throughput is reduced due to excessive redundancy. If the CQI is too aggressive, the block error rate (BLER) will be too high and cripple the throughput.

An MCS is typically associated with a transport block (TB), which is the physical-layer payload for a receiver in a subframe. That is, one MCS applies to one transport block, even though a TB may comprise one or more code blocks (CBs), each of which maps to a distinct channel encoding/decoding instance. A distinct MCS can be assigned to each CB or a group of CBs that is smaller than a TB.

Some embodiments use one MCS per TB, because (1) this minimizes the associated control signaling overhead and (2) this is without significant disadvantage as long as the decoding performance is expected to be similar for all CBs in the TB. This can usually be expected to be the case if the received signal conditions are similar for all CBs in the TB. Under these conditions it is also reasonable to have a single common link-quality measurement that is deemed representative for the CBs in the TB and, based on this measurement, a link adaptation mechanism determining the modulation and coding scheme used for all CBs.

With intra-subframe link-quality fluctuations, however, a link adaptation scheme operating on TB granularity for reporting and MCS allocation will lead to throughput degradation. Specifically, having the same MCS allocated to all CBs can mean too much redundancy in some CBs and too little in other CBs. The effect will be detrimental in particular if a few certain CBs systematically experience reduced link quality and at the same time retransmission schemes are used with TB-based signaling of decoding success or failure, represented by acknowledgement (ACK) and negative-acknowledgement (NACK) indicators. In this case even a single CB, being insufficiently protected by the shared MCS assignment, can lead to retransmission of the whole TB.

Some embodiments consider intra-subframe link-quality fluctuation in terms of frequency-selectivity in order to cover effects of such issues as fading channels. LTE systems, for instance, support subband CQIs, where a subband is a signal block occupying a part of the frequency spectrum and spanning the full subframe in time. Such subband CQI schemes do not enable temporal partitioning and are utilized for frequency-selective scheduling, i.e., finding the best spectral parts for a given user, but they are not designed for time-domain water-filling type of capacity maximization (i.e., assigning multiple MCSs for a single user in a subframe).

Intra-subframe link-quality fluctuation can be significant under a range of conditions, many of which may apply in newer generations of communication systems such as 5G. These conditions include: non-colliding interference from other cell's reference signals, as for example in LTE heterogeneous networks; OFDM-symbol-specific interference due to uplink (UL) or downlink (DL) allocation schemes with OFDM-symbol granularity, which is particularly relevant in low-latency systems, where decoding timing constraints may dictate a code block to occupy a small time interval within a subframe; coexistence of different UL/DL frame and/or subframe structures, which is particularly relevant in flexible TDD systems; and OFDM-symbol-specific aspects of UL/DL signal transmission such as, e.g., time-domain beam-cycling, which is particularly relevant in higher frequency bands with reliance on beamforming.

These conditions suggest that temporal intra-subframe fluctuation, e.g., per-OFDM-symbol, can be substantial in a range of new communication systems. The impact of such fluctuation may become more severe as the number of code blocks per transport block increases, which is indeed the case for high data-rate systems supporting large bandwidths and higher modulations.

A class of per-code block link adaptation methods can be used to support multiple MCSs for a single user in each subframe with fine time-frequency granularity, without a dependency on RS structure, and without prohibitive uplink signaling overhead.

A transmitter may use this class of per-code block link adaptation methods to increase throughput in scenarios with significant received signal quality difference among CBs. For example, a transmitter side MCS configuration and/or adjustment can be done per CB or per group of CBs. The MCS configuration and/or adjustment can be based on receiver side feedback reporting per CB or group of CBs without using additional reference signals supporting the finer feedback granularity. By utilizing a configurable reporting and adjustment mechanism based on heavily quantized reporting schemes, the system can use very low control signaling bandwidth (e.g., on the order of one bit per CB or group of CBs).

Throughput performance can be improved with limited additional UL and DL control overhead compared to the state-of-the-art communication systems. In particular, data/RS-based water-filling capacity maximization in both spectral and temporal domain can be supported in CB granularity. UL overhead can be minimized with highly quantized signal quality indicators, which may be used to save bandwidth or alternatively allow a higher reporting frequency thus faster adjustment reaction times. DL overhead can be limited since the schemes do not use extra DL RS.

Generalization of subband CQI schemes does not address the intra-subframe link-quality fluctuations in CB granularity. Even if multiple MCSs are to be supported with higher signaling overhead, mapping the subband CQIs to code blocks is unclear, since the subband-to-code block mapping may be many to many, i.e., subband boundaries and code block boundaries might not overlap. This holds true even if subband definition is relaxed to any localized group of time-frequency resources, because CQIs use RSs and such time-frequency resource grouping depends on the RS structure.

The per-CB MCS optimization can reduce HARQ retransmission overhead due to retransmitting the whole TB even when a small number of CBs contain errors. This is because such optimization equalizes per-CB BLER in the subframe.

The performance improvement is especially significant in newer generations of low-latency high-throughput systems, where substantial (time-varying) decoding performance difference among CBs can be expected.

In the description, 3GPP terminology and conventions with respect to fifth generation (5G) systems are used. However, the description should not be limited to 5G technology.

FIG. 1 is a flow chart illustrating a method 100 of dynamic HARQ block size switching consistent with embodiments disclosed herein. The method 100 can be performed by systems such as those shown in FIGS. 13-15. In block 102, the receiver estimates intra-subframe fluctuation level of per-code block errors. In block 104, the transmitter maps the estimate to HARQ block size. In block 106, the receiver determines HARQ ACK according to the selected HARQ block size. In block 108, the receiver indicates the selected HARQ block size to the data transmitter. In block 110, the receiver transmits the HARQ ACK.

As FIG. 1 shows, the switching can be based on an estimate of intra-subframe error fluctuation (which is also known as error micro fluctuation). This error micro fluctuation can be defined as the fluctuation of intra-subframe error events (such as per-code block error events within a subframe). The error micro fluctuation can be modeled as a pattern of error detection (e.g., code block CRC check) results or as a set of signal allocation patterns in the serving and interfering transmitters. The error detection metrics can be used for devices (UEs; user equipment) receiving downlink transmission, as devices typically do not have sufficient signal allocation information for the switching. In some embodiments, the third and the fourth operations in FIG. 1, including determining HARQ ACK and indicating the HARQ block size, are asynchronous. These operations can be performed in parallel or in a different order.

Depending on the embodiment, a control-signal block containing HARQ ACK feedback can have restrictions on the size of the time-frequency resource it occupies. In one embodiment, the restriction is that the total control-signal block size stays the same even with possible dynamic changes in the HARQ feedback size. The bits freed with smaller HARQ feedback can be used to carry extra information that allows other ways of improving data throughput. Other embodiments can include dividing a user data in a subframe to multiple blocks and assigning distinct MCS to each block. For example, a distinct MCS can be assigned to each subband or OFDM symbol, based on per-subband/symbol received-signal quality information. In an embodiment, selective allocation has an effect of reducing the error micro fluctuation (i.e., equalizing the error rate across time and frequency within a subframe) and thereby reducing use of smaller HARQ block sizes.

Figure 2:
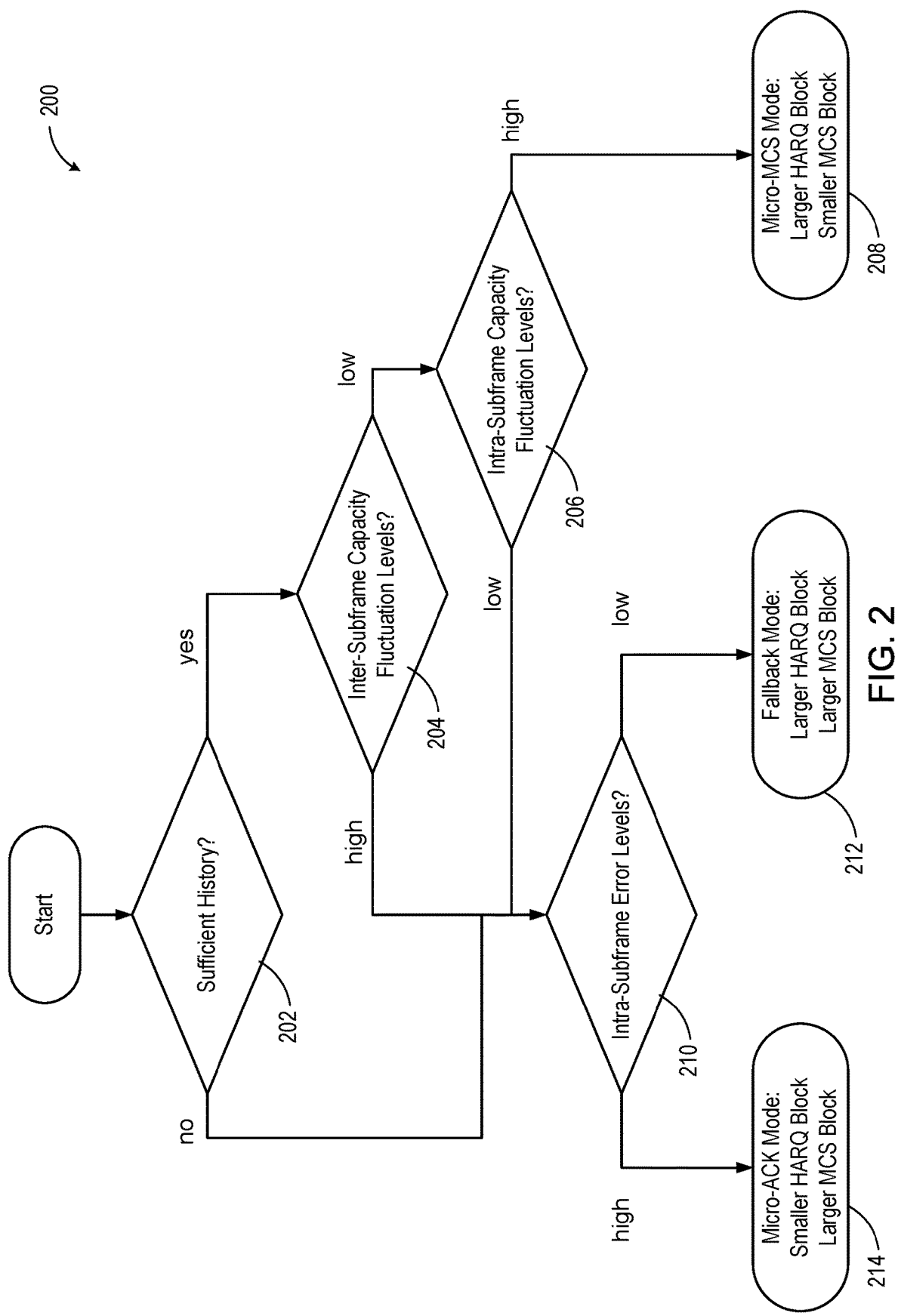
FIG. 2 is a flow chart illustrating a method of dynamic HARQ mode-switching consistent with embodiments disclosed herein.

FIG. 2 is a flow chart illustrating a method 200 of dynamic HARQ mode-switching consistent with embodiments disclosed herein. The method 200 can be performed by systems such as those shown in FIGS. 13-15. In block 202, the system determines whether there is sufficient history to determine inter-subframe fluctuation levels. If not enough history is found, the method 200 proceeds to block 210 to determine intra-subframe error levels. If high intra-subframe levels are found in block 210, the system uses a micro-ACK mode that comprises a smaller HARQ block and a larger MCS block in block 214. If low intra-subframe levels are found in block 210, the system may use a fallback mode with a larger HARQ block and a larger MCS block in block 212.

However, if sufficient history is found in inter-subframe capacity fluctuation levels in block 202, the inter-subframe capacity fluctuation levels are evaluated in block 204. If high inter-subframe capacity fluctuation levels are found in block 204, the inter-subframe error levels are evaluated as before.

However, if low inter-subframe capacity fluctuation levels are found in block 204, the intra-subframe capacity levels are evaluated in block 206. If low intra-subframe capacity levels are found in block 206, the inter-subframe error levels are evaluated as before. However, if high intra-subframe capacity fluctuation levels are found in block 206, the system uses a micro-MCS mode comprising a larger HARQ block and a smaller MCS block in block 208.

The method 200 represents one "cycle" of HARQ and MCS block size determination at a data receiver. This cycle may be done once per subframe or per multiple subframes. This example supports the micro-ACK and micro-MCS modes as well as a third fallback mode with a larger HARQ block and a larger MCS block (e.g., the HARQ block of the micro-MCS mode and the MCS block of the micro-ACK mode). In some embodiments, the micro-ACK or the fallback mode may be used initially before a first decision is made. An intra-subframe capacity fluctuation (or capacity micro fluctuation) denotes the fluctuation of per-code block spectral efficiency within a subframe. An inter-subframe capacity fluctuation (or capacity macro fluctuation) denotes the fluctuation of the capacity micro fluctuation pattern over multiple subframes. The capacity macro fluctuation computation starts when there is a sufficient number of observations.

In an embodiment, the three modes shown in FIG. 2 correspond to distinct control channel formats. For example, for downlink data, each mode may be associated with a distinct physical uplink control channel (PUCCH) format. The micro-ACK and micro-MCS modes share the same PUCCH format but with different combination of member fields. A UL fallback mode is associated with a shorter PUCCH format. In one embodiment, a variation of this procedure removes the fallback mode, and uses the micro-ACK mode instead.

In one set of embodiments (referred to as Embodiment Group 1), a UE-driven dynamic HARQ block size switching is enabled. In one embodiment, a one-bit trigger is configured by eNB to enable UE-driven switching, where "0" means enable UE-driven, and "1" means network-driven. In one embodiment, a switching starts at the subframe n+k after receiving trigger at the subframe n. Here, the parameter k can be configured by higher layer signaling.

For example, within a context of downlink data transmission, a UE may select in each subframe one of two HARQ block sizes—(1) a "subframe" size corresponding to the PDSCH (physical downlink shared channel) region of a subframe or (2) a "symbol" size corresponding to an OFDM symbol, based on code block CRC check results. If code blocks are error-free or if more than a certain number of the code blocks contain errors, the subframe mode is selected. Otherwise, a symbol mode is selected.

In one embodiment, a threshold of the number of code block errors is configured by an eNB. When the number of code block errors exceeds this threshold, the subframe mode is selected; otherwise the symbol mode is selected.

For example, a one-bit indicator is prepended to a HARQ ACK feedback to indicate a HARQ block size to the eNB. A value of "0" denotes a subframe mode and a value of "1" denotes a symbol mode. The subframe mode ACK field may be a single bit (per transport block in MIMO). The OFDM symbol mode ACK field consists of more than one bit, where each bit may correspond to a distinct OFDM symbol in the PDSCH region. As an example, if the PDSCH region comprises 11 OFDM symbols, an ACK field may comprise 11 bits per transport block. This per-symbol ACK can be derived by bundling the ACK values of the code blocks in the OFDM symbol.

A subframe mode with its smaller HARQ feedback field can correspond to a smaller uplink control information (UCI). By using this method, an embodiment can offer a trade-off platform between the retransmission overhead and the feedback overhead. A variation to some embodiments introduces other HARQ block size candidates, such as a block of four OFDM symbols. In one embodiment, a granularity of HARQ block size is configured by eNB through higher layer signaling, such as shown in the table below.

| Granularity index | HARQ block size |
| --- | --- |
| "0" | 1 OFDM symbol |
| "1" | 4 OFDM symbols |
| "2" | 8 OFDM symbols |
| "3" | All OFDM symbols |

In other embodiments, a granularity index is introduced to the HARQ report, so as to inform eNB which granularity has been chosen by a UE.

A medium granularity can be useful when the error micro fluctuation is bursty (i.e., detection errors tend to congregate in a small group of contiguous OFDM symbols). The medium granularity can also be useful when multiple aggregated downlink subframes are associated with a single UCI. This allows the system to keep the maximum HARQ ACK size to a desired limit. Another embodiment maps the smaller HARQ block to a subband rather than an OFDM symbol. This spectral partition can be more suitable for systems with highly frequency-selective signal quality and horizontal code blocks, whereas the temporal partition (e.g., OFDM symbols) is more suitable for low-latency systems with vertical code blocks.

In another set of embodiments (referred to as Embodiment Group 2), the system uses dynamic mode-switching between micro-ACK and micro-MCS. In one embodiment, in the context of downlink data transmission, UE or eNB selects one of two PUCCH formats—(1) a "micro-MCS" format containing a smaller HARQ ACK field in subframe granularity and a larger CSI (channel state information) field with per-symbol CQIs (also referred to as micro CQIs), and (2) a "micro-ACK" format containing a larger HARQ ACK field in OFDM symbol granularity and a smaller CSI field with a subframe CQI (i.e., a CQI corresponding to the PDSCH region of a subframe). The larger CSI in the micro-MCS format includes more than one CQI, each of which may correspond to a distinct OFDM symbol in the PDSCH region. The format selection may be conveyed by an indicator that may be shared with the indicator for dynamic HARQ block size in the previous Embodiment Group 1.

This type of mode-switching can enable two controls: first, to limit the maximum UL control size, and second, to offer two different methods of improving downlink throughput that exploit the temporal micro fluctuation of error or spectral efficiency. Limiting the maximum UL control size can be useful in, for instance, low-latency OFDM systems with a single dedicated OFDM symbol for UL control.

The switching, if UE-triggered, can be based on micro CQIs. Such micro CQIs of symbol granularity is feasible since received signal quality can be derived from reference signals and also data. For instance, there exist efficient estimators of mutual information from data log-likelihood ratio samples. If a micro CQI pattern does not change over multiple subframes, and the range of the micro CQIs in the current subframe exceeds a reference range defined by the subframe CQI and an upper and a lower margin from the subframe CQI, the UE may select micro-MCS format. Otherwise (i.e., if the micro-CQI pattern rapidly changes over multiple subframes or if the range of the micro CQIs in the current subframe lies within the reference range), the UE may select the micro-ACK format.

The capacity macro fluctuation, represented by the change of micro-CQI patterns over subframes, can be more random if allocated data is the dominant interference source, and it can be more stable if non-colliding reference signals and/or UL control signals are a dominant interference source. In the latter case, link adaptation via per-symbol CQI may equalize the per-symbol error rates, achieving higher throughput while reducing the use of per-symbol HARQ ACK feedback.

Figure 3:
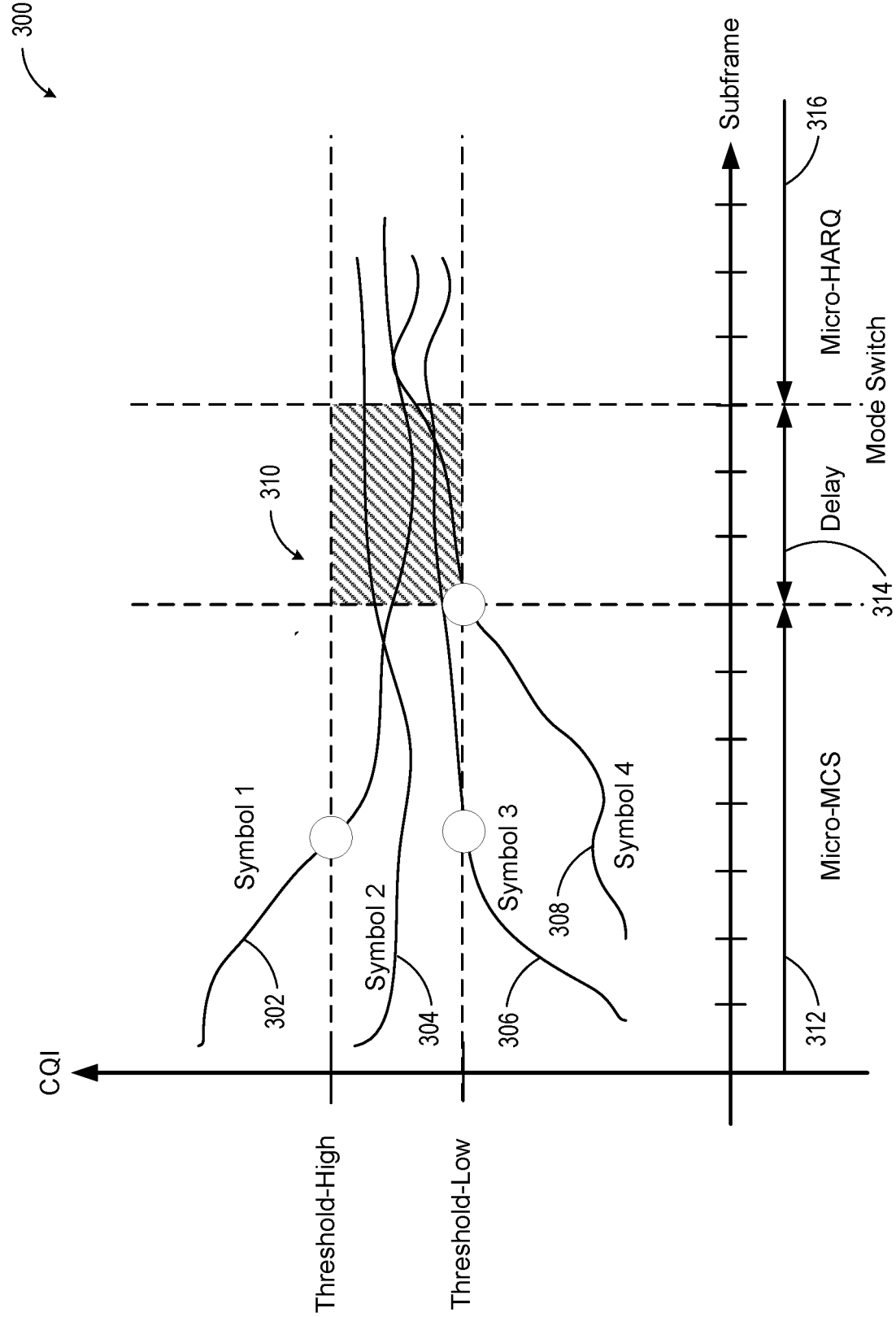
FIG. 3 is a diagram illustrating movement from a micro modulation and coding scheme (MCS) format to a micro-acknowledgement (ACK) format based on channel quality indicator (CQI) consistent with embodiments disclosed herein.

FIG. 3 is a diagram 300 illustrating movement from a micro-MCS format to a micro-ACK format based on channel quality indicator (CQI) consistent with embodiments disclosed herein. An example of switching from the micro-MCS format to the micro-ACK format for a four-symbol PDSCH region configuration is shown. In the example, the switch is triggered when a range of micro CQIs all fall within a reference range for a configurable minimum amount of time. In FIG. 3, the threshold_High and threshold_Low define the reference range, to which micro CQIs are compared.

For example, the system starts in a micro-MCS format 312, having symbol 1 with a high CQI and symbols 3 and 4 with low CQIs. As the system operates while in the micro-MCS mode, the CQIs of symbols 302, 304, 306, 308 transition to being between the thresholds. When all the CQIs of the symbols 302, 304, 306, 308 lie within the thresholds for a time period indicated as a delay 314 corresponding to an area 310, the system switches to a micro-HARQ mode 316.

The thresholds, and hence the reference range, may be based on the current set of MCSs or a subframe CQI, and they may be time-varying. In one embodiment, the parameters that determine the thresholds, e.g., the margins from the mean of current MCSs, can be configured by eNB via higher layer signaling. As FIG. 3 shows, the delay 314 between the trigger and the actual mode switch may be introduced to prevent a ping-pong effect.

In an embodiment, a variant of the UE-triggered switching is not based on measuring CQI but another signal quality metric such as mutual information or signal-to-interference-and-noise ratio (SINR).

A variation for the measurement reporting from the UE to the eNB is to use a bit field whose length may be equal to the number of OFDM symbols. Such a highly efficient bit field can be constructed by associating each bit to a differential increment/decrement of MCS of a given OFDM symbol from that of the previous OFDM symbol. Another embodiment supports a third, short PUCCH format, corresponding to a fallback mode with subframe HARQ block and subframe MCS block, as suggested in FIG. 2. In this case, the switching between the micro-ACK and fallback modes may be based on code block CRC check results.

The switching, if eNB-triggered, can be based on the network knowledge of reference signal allocation and UL-DL configuration in the serving and the interfering cells. While the two embodiments above are described in downlink contexts for clarity, the dynamic switching mechanism can also apply in uplink as well.

Figure 4:
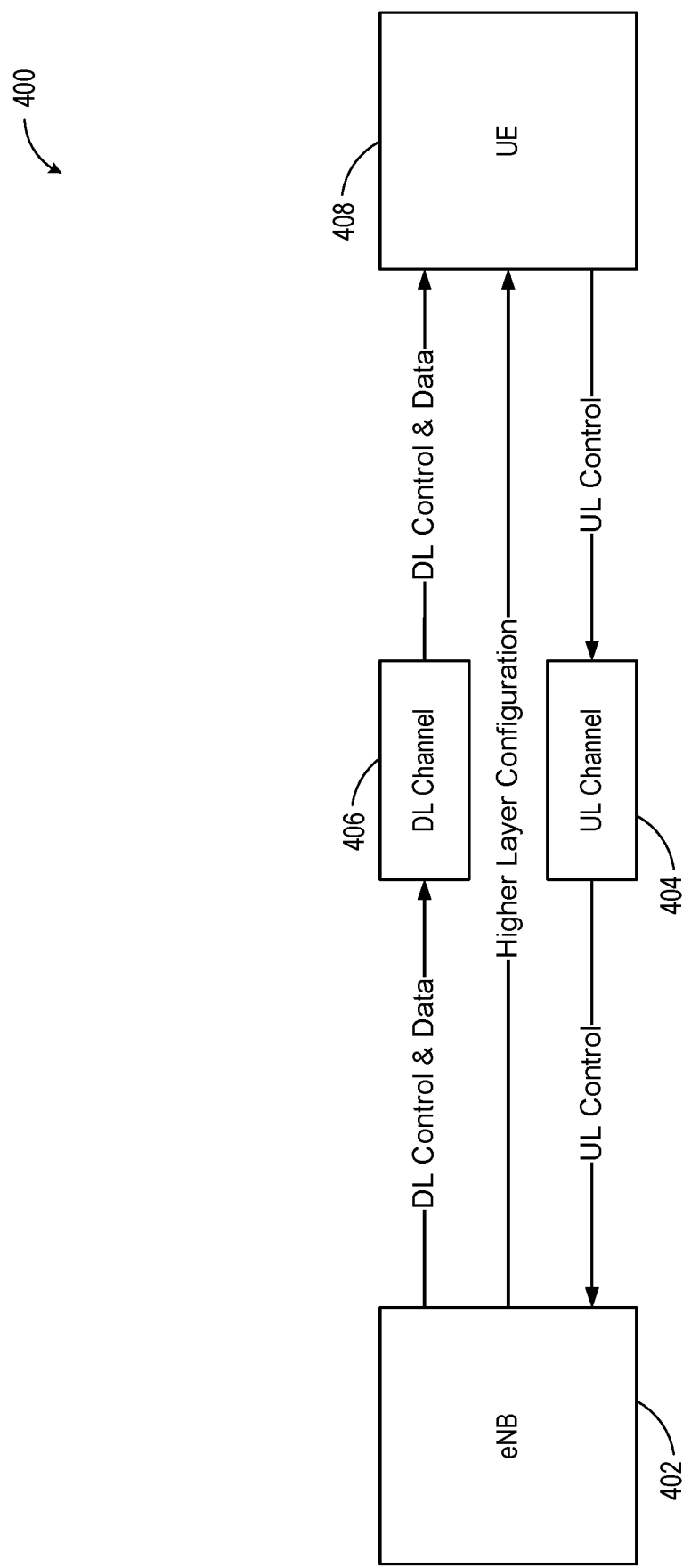
FIG. 4 is diagram of a control system for link adaptation consistent with embodiments disclosed herein.

FIG. 4 is a diagram of a control system 400 for link adaptation consistent with embodiments disclosed herein. An eNB 402 transmitting a signal to a UE 408 via a DL connection is subjected to a DL transmission channel 406. A transmitted signal consists of a control part containing configuration information and a data part containing the useful information. In the downlink direction, there is also an indirect communication channel shown which represents information transmitted via higher communication layer mechanisms. Communication over this channel may occur less frequently compared to the data and control transmission mentioned above. On an uplink channel 404 (i.e., from the UE 408 to the eNB 402) control information is provided.

Figure 5:
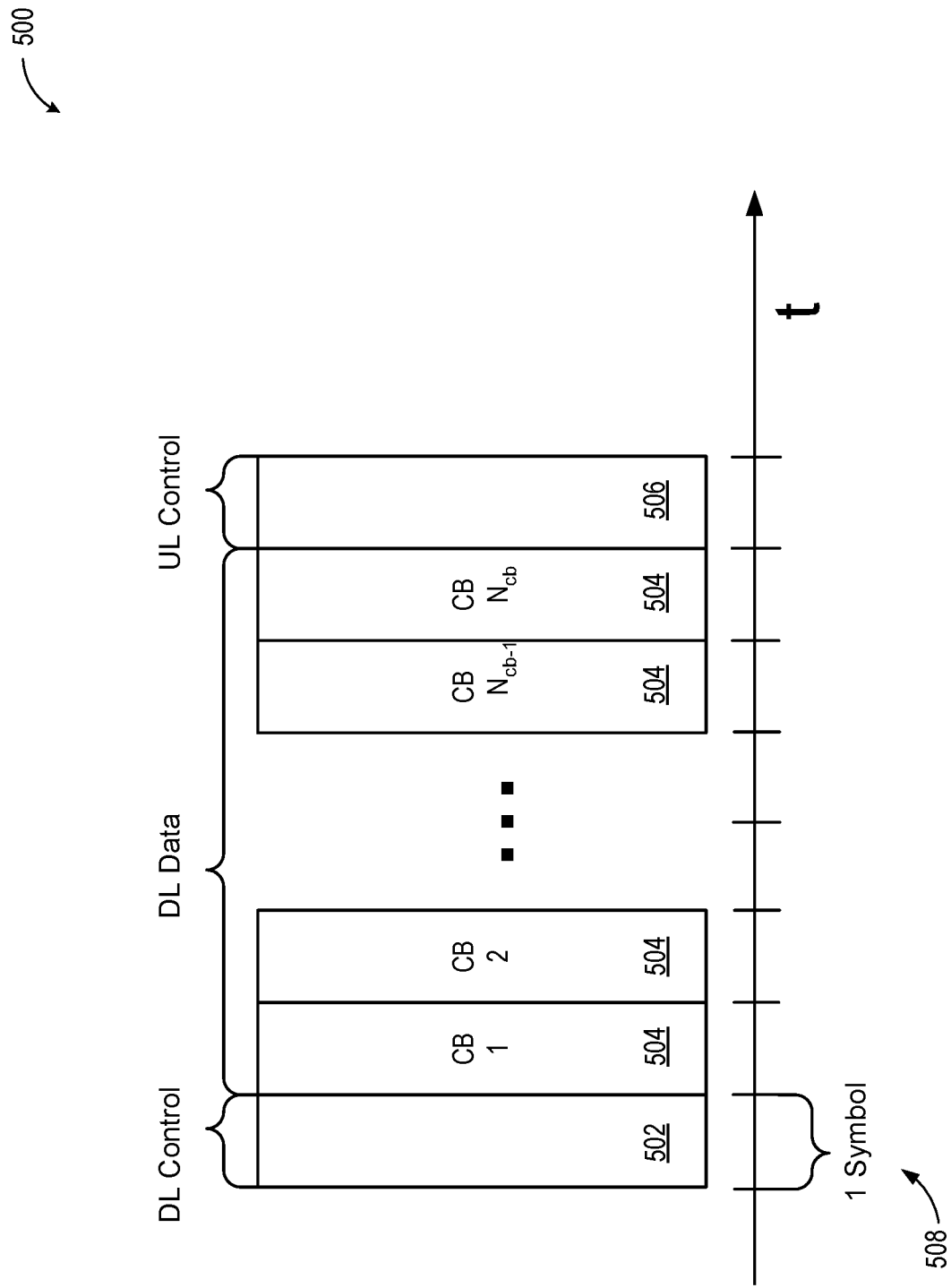
FIG. 5 is a diagram of a transport block with code blocks consistent with embodiments disclosed herein.

FIG. 5 is a diagram of a transport block with code blocks consistent with embodiments disclosed herein. FIG. 5 shows an example subframe structure 500. A DL control transmission 502 precedes data transmission of a series of code blocks (CBs) 504. The DL control transmission 502 configures DL data reception. A UL control transmission 506 follows data transmission and contains link adaptation feedback and ACK/NACK reports.

One TB is assumed to include CBs 504 within the subframe structure 500. In the example outlined further on, one CB 504 is assumed per symbol 508. In general though, the method and systems are applicable for cases where one data symbol carries multiple CBs 504 or a single CB 504 covers multiple data symbols. An MCS adjustment mechanism is applied with a granularity finer than one TB.

Figure 6:
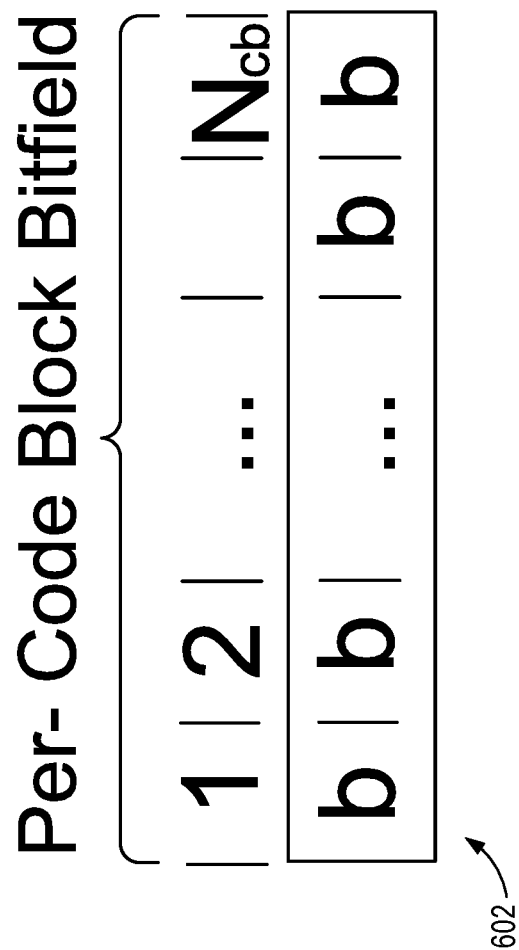
FIG. 6 is an example of a low bandwidth control bit field consistent with embodiments disclosed herein.

FIG. 6 is an example of a low bandwidth control bit field 602 consistent with embodiments disclosed herein. In the embodiment shown, the bit field 602 with UL control information is defined using one bit per CB, up to the number of CB ($N_{cb}$). Each bit contains a one-bit measurement result associated to the corresponding CB. Such per-CB signaling scheme allows the eNB to perform fast CB-specific tuning of modulation and coding, i.e., adjustment of CB-specific robustness. This tuning can level out performance differences among the CBs at the receiver.

Figure 7:
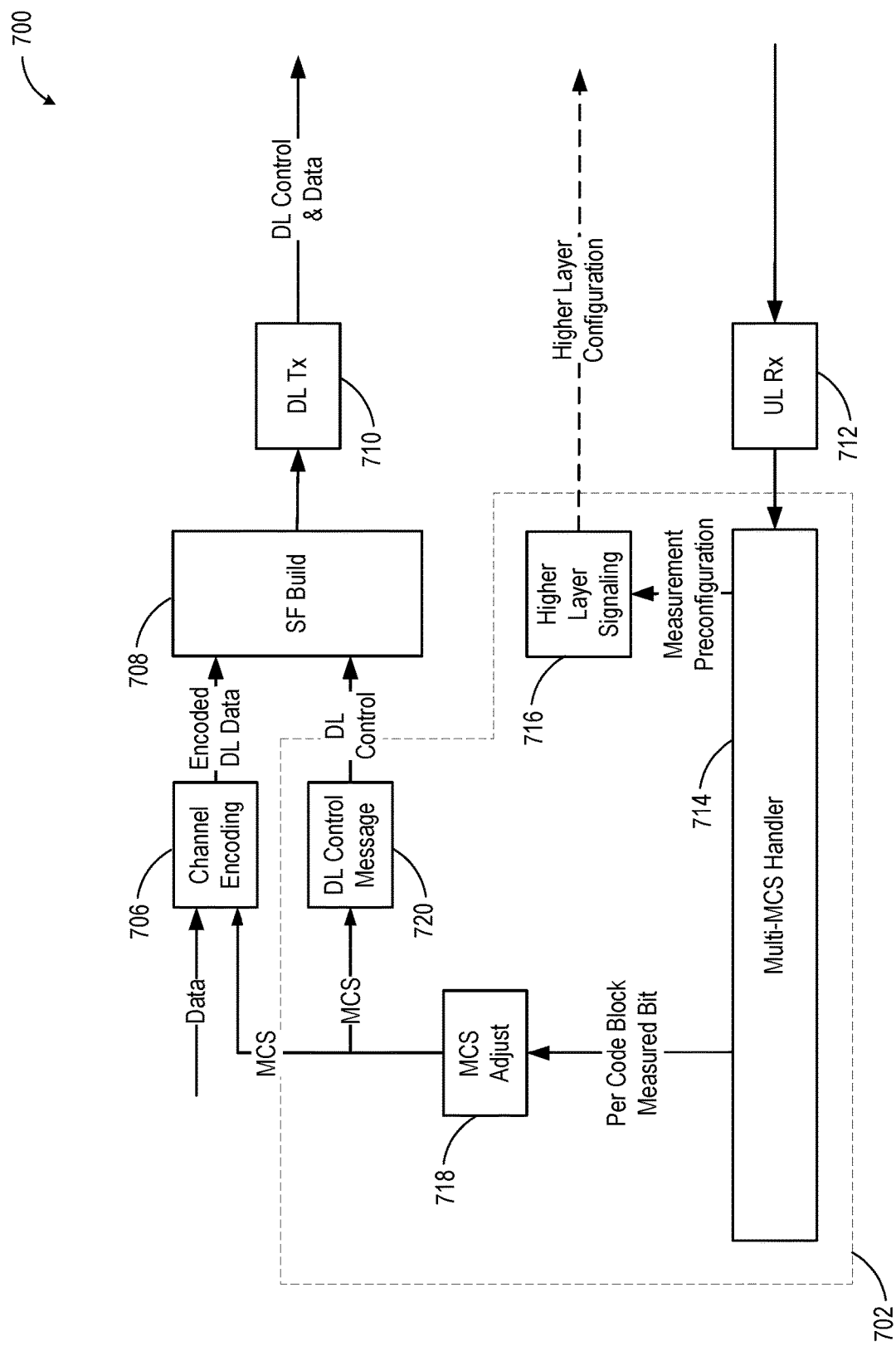
FIG. 7 is a diagram of an apparatus of an enhanced node B (eNB) consistent with embodiments disclosed herein.

FIG. 7 is a diagram of an apparatus of an eNB 700 consistent with embodiments disclosed herein. The eNB 700 includes additional circuitry and/or blocks 702 to provide the multi-MCS functionality. Data and an MCS per portion of a TB (e.g., per CB) comprise the input for a channel encoding block 706. The encoded data is sent to a subframe construction block 708 and combined with DL control information. The subframe is sent over a downlink 710. Higher level signaling is sent via a higher layer (HL) signaling interface 716. Over an uplink 712, measurement information is given to a multi-MCS handler 714. The multi-MCS handler 714 provides a measurement preconfiguration to the higher layer signaling interface 716 and per code-block measurement information to an MCS adjust block 718. The MCS adjust block 718 provides MCS information to the channel encoding block 706 and a DL control message block 720.

For example, an MCS adjustment mechanism is based on per-CB MCS control in the eNB 700 and the per-CB measurement engine in the UE. In the eNB 700, the CB MCS handler in the eNB 700 forwards CB-specific measurement info to the MCS adjustment engine and selects the measurement type to be used by the UE. On measurement configuration change, the eNB 700 triggers the reconfiguration via higher layer signaling. The MCS adjustment engine determines modulation and coding schemes for each CB and forwards the information to DL control signaling and channel coding.

Figure 8:
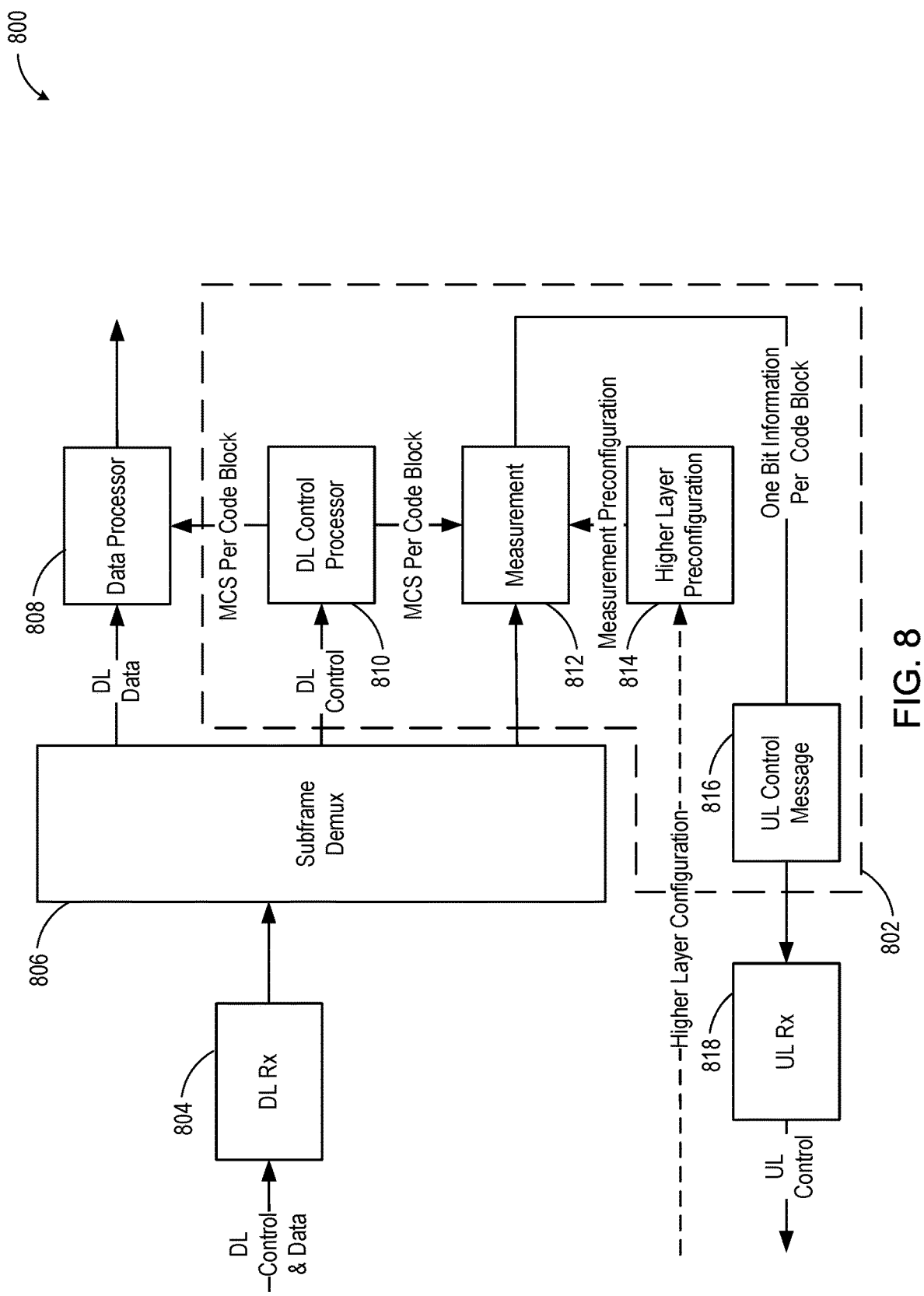
FIG. 8 is a diagram of an apparatus of a user equipment (UE) consistent with embodiments disclosed herein.

FIG. 8 is a diagram of an apparatus of a UE 800 consistent with embodiments disclosed herein. The UE 800 includes additional circuitry and/or blocks 802 to provide the multi-MCS functionality. The UE 800 receives data from a downlink channel 804. The data is decoded by a subframe demultiplexer 806. The subframe demultiplexer 806 provides data to a data processor 808, DL control information to a DL control processor 810 and data regarding link-quality measurements to a measurement block 812. The DL control processor 810 provides the MCS per portion of the TB (e.g., per CB) to the data processor 808 and the measurement block 812. The measurement block 812 uses the MCS per CB and measurement configuration (from a higher layer configuration block 814) to provide low bandwidth control information (here, one bit of measurement information per CB) to a UL control message block 816. The UL control message block 816 sends the low bandwidth control information to the eNB over a UL channel 818.

For example, the UE 800, if applicable, reconfigures the measurement mode based on higher layer signaling from the eNB, performs measurements per CB as configured and fills the UL control bit field with the CB-specific measurement results. In one embodiment, an initial MCS is conservatively estimated by eNB at the beginning of transmission. In another embodiment, an initial CQI is reported by the UE 800, which is either a subframe-specific report or a code block-specific report. This report can be used to calculate the MCS at the beginning. Also, it can be utilized to reset the CQI adjustment loop when a CQI state between eNB and the UE 800 becomes asynchronous.

Figure 9:
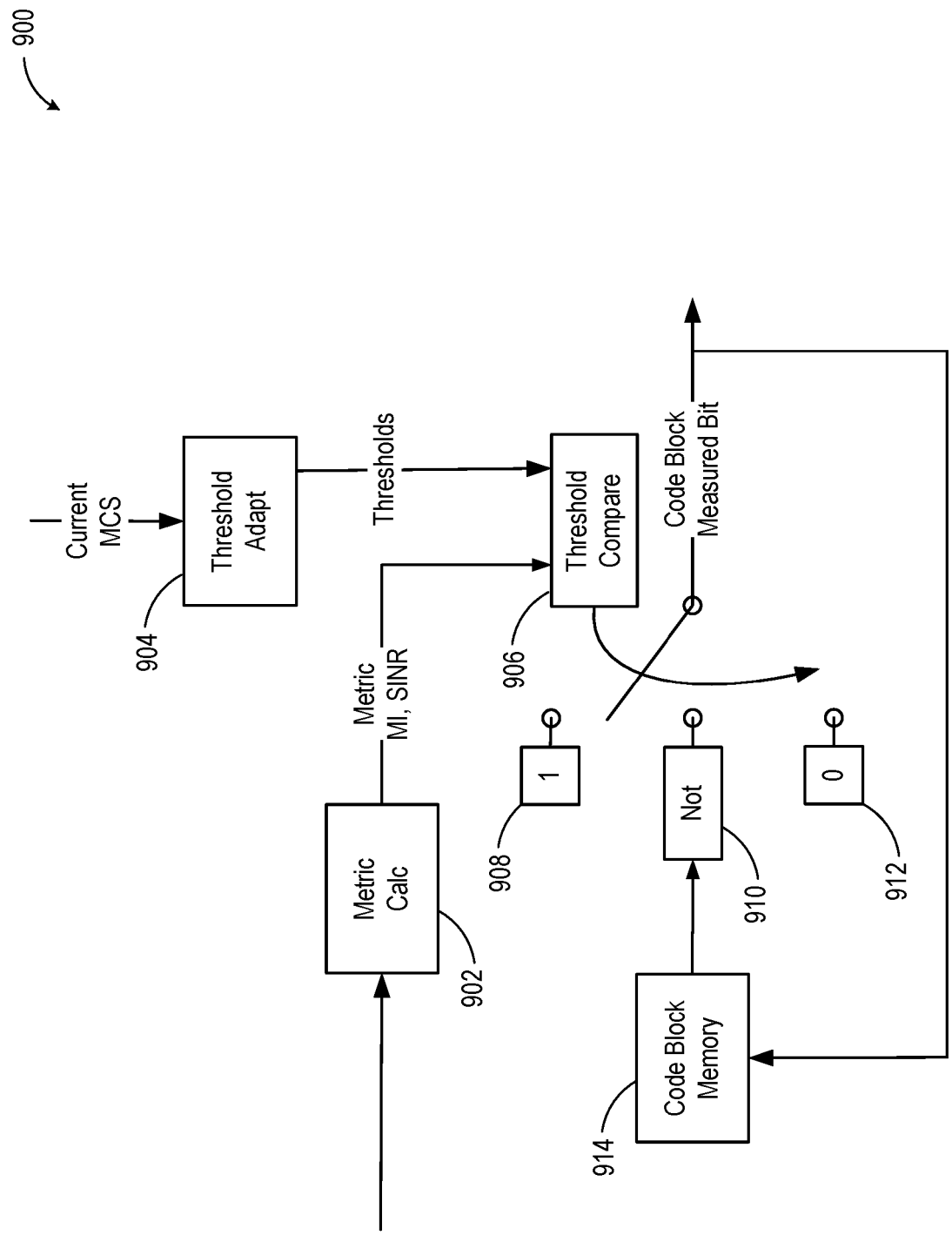
FIG. 9 is a diagram of a system for code block-specific MCS tuning consistent with embodiments disclosed herein.

FIG. 9 is a diagram of a system 900 for code block-specific MCS tuning consistent with embodiments disclosed herein. A threshold comparison block 906 receives a metric from a metric calculating block 902 and thresholds from a threshold adaptation block 904. The threshold comparison block 906 determines whether to increase or decrease MCS protection (and correspondingly reduce or increase the transmitted data rate) or leave the protection as is. Here, a repeated "0" value 912 is an indicator to increase MCS protection and decrease the transmitted data rate and a repeated "1" value 908 is an indicator to decrease MCS protection and increase the transmitted data rate. An alternating metric value (as stored by the code block memory 914 and detected by the not block 910) indicates that the threshold adaptation block 904 leave the MCS unchanged.

For example, a single-bit resolution measurement can be used for CB-specific MCS tuning. For each CB, an associated bit is determined as follows. A metric related to the transmission channel capacity of the CB is determined. One example for such a metric would be mutual information determined based on data symbol soft decisions. Other metrics are possible such as SINR, etc. An upper and a lower threshold are determined, splitting the metric value range into three regions. The regions can be based on a current MCS used for the CB, or alternatively configured, e.g., by the eNB via higher layer signaling. A final measurement result depends on a value of the metric relative to the two thresholds. Specifically, when the metric value is above the upper threshold, the associated bit is "1," indicating a recommendation by the UE that the MCS can be increased to the next allowed MCS with less protection than the current one. When the metric value is below a lower threshold, the associated bit is "0," indicating a recommendation by the UE that the MCS can be decreased to the next allowed MCS with more protection than the current one. When the metric value lies between the upper and lower thresholds, the associated bit is the opposite of the bit associated with the previous CB, indicating a recommendation by the UE to keep the current MCS (i.e., the current level of robustness).

Figure 10:
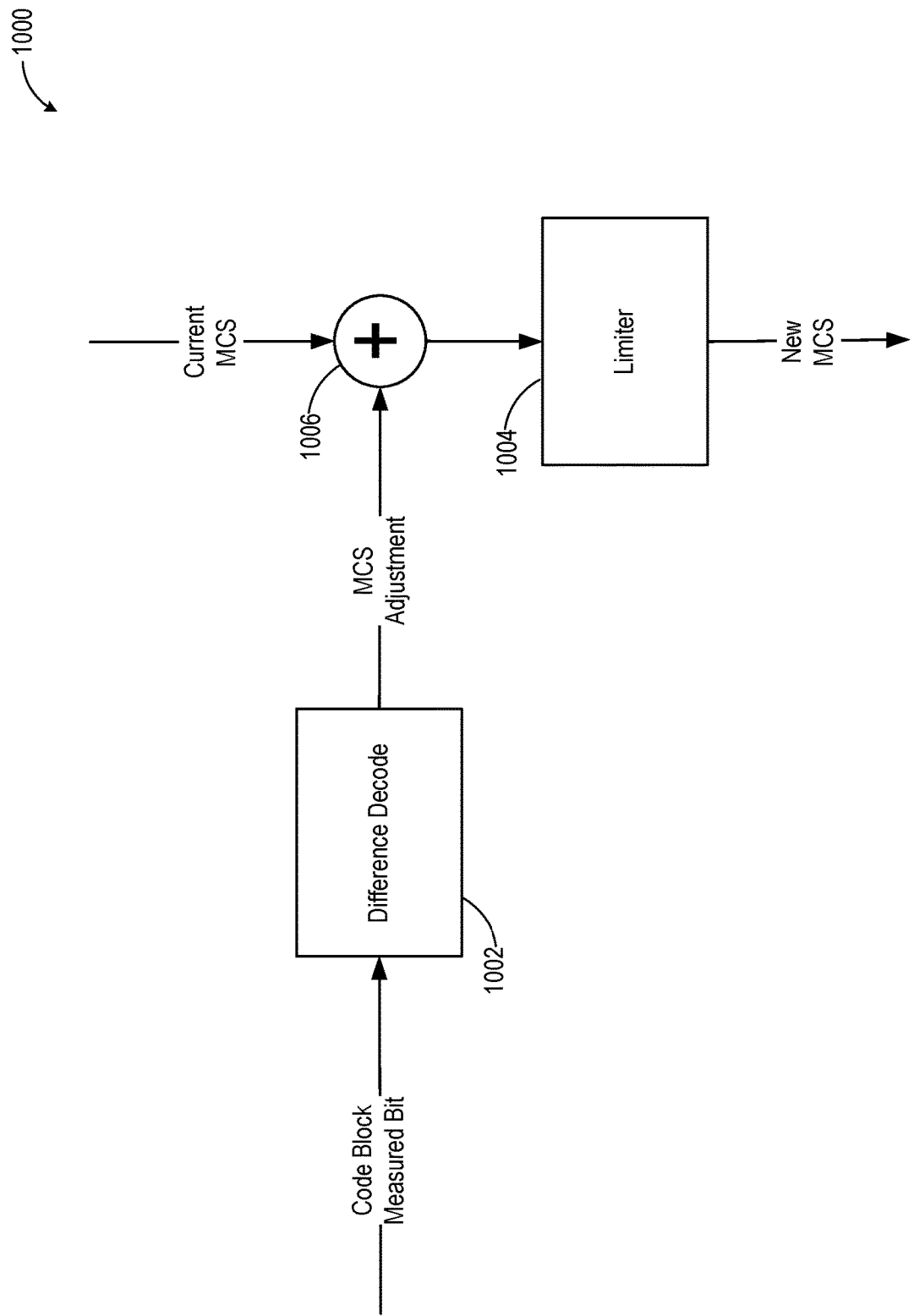
FIG. 10 is a diagram of a system for differential decoding of measurement information consistent with embodiments disclosed herein.

FIG. 10 is a diagram of a system 1000 for differential decoding of the measurement information consistent with embodiments disclosed herein. At the eNB, the embodiment shown uses a "differential" decoding of the measurement information provided by the UE. A difference decoder 1002 determines whether the MCS increases, decreases, or remains unchanged. The current MCS is provided to adjustment block 1006 for adjustment by the difference decoder 1002 and limited by a limiter 1004. The limiter 1004 then provides the new MCS to the system 1000.

For example, for every CB two bits in sequence are evaluated in order to determine one of three cases. For example, a "00" value is an indicator to increase MCS protection and decrease throughput and an "11" value is an indicator to decrease MCS protection and increase throughput. An alternating metric value of "01" or "10" indicates that the threshold adaptation block leave the MCS unchanged.

Figure 11:
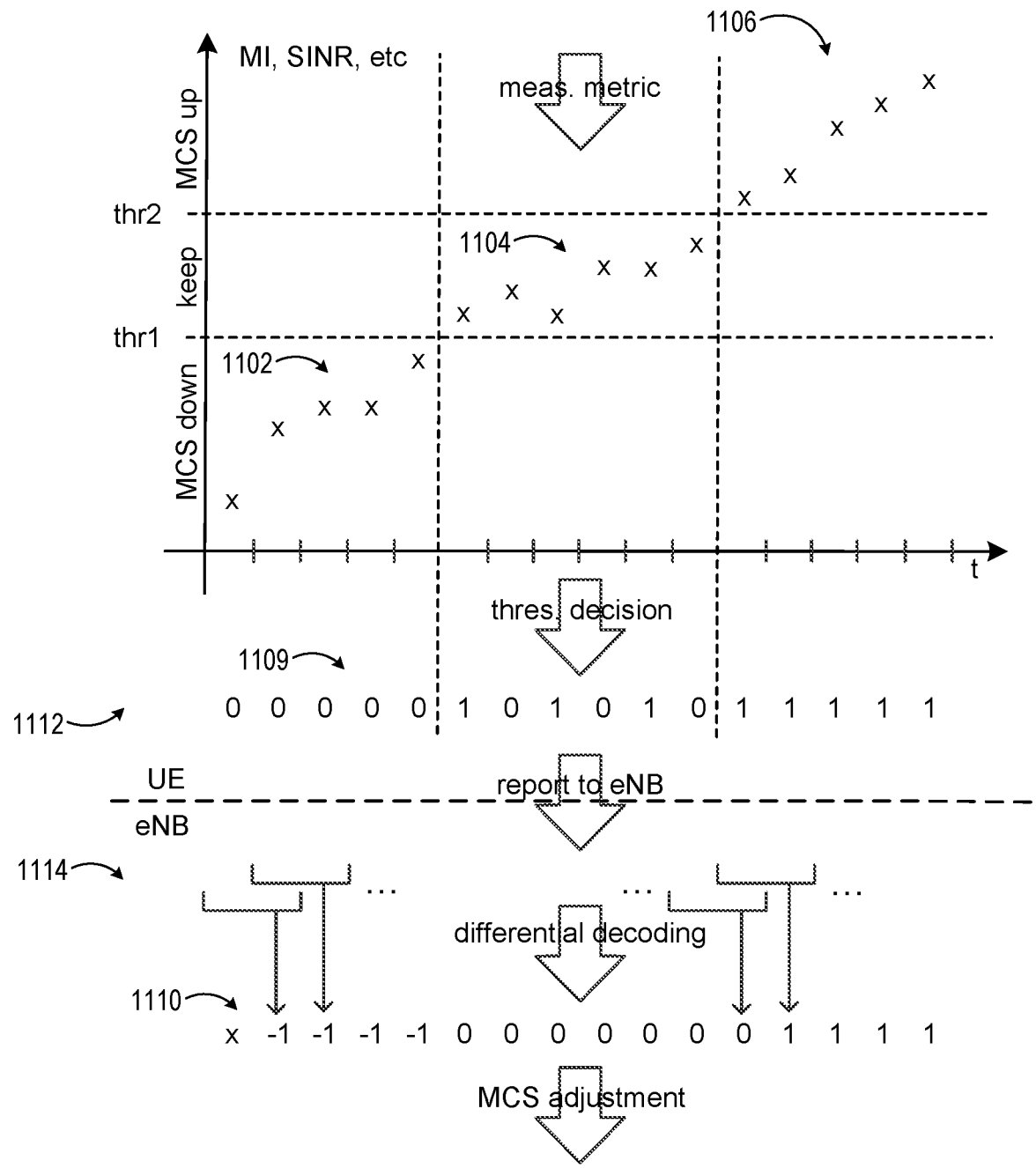
FIG. 11 is a diagram of measurement metrics used for MCS adjustment consistent with embodiments disclosed herein.

FIG. 11 is a diagram of measurement metrics used for MCS adjustment. A UE 1112 provides a condensed metric 1109 (condensed via quantization or some other mapping from a metric—mutual information, SINR, etc.—shown on the Y-axis) over time to an eNB 1114, which is used to adjust MCS per CB (or other portion of a TB). In the embodiment shown, the metric is low in a first timeframe 1102 and the MCS is adjusted to favor data robustness (protection, etc.). In a second timeframe 1104, the metric lies between the two thresholds (thr1 and thr2). The MCS remains unchanged, as the UE 1112 recommends no change to the MCS. In a third timeframe 1106, the metric is high. The UE 1112 recommends adjustment to the MCS that reduces robustness (protection, etc.) and favors throughput.

The eNB 1114 uses the condensed metric 1109 to determine whether to change the MCS or not. In the embodiment shown, the eNB 1114 uses a differential decoding to determine whether a value repeats in the condensed metric 1109. A low value in a differential decoding result 1110 indicates a change in MCS to favor data robustness (protection, etc.). A high value in the differential decoding result 1110 indicates a change in MCS to reduce robustness (protection, etc.) and favors throughput. A zero value in the differential decoding result 1110 indicates no change to the MCS.

For example, in the MCS adjustment procedure shown, measurement metric results are plotted over time. Initially the metric results are below the lower threshold in the first timeframe 1102. Then results are in between the lower and upper threshold in the second timeframe 1104. Finally, results exceed the upper threshold in the third timeframe 1106. This is reflected in the measurement bits reported to the eNB 1114 (as the condensed metric 1109) first being "0," then toggling between "0" and "1," then finally being "1." The differential decoding in the eNB 1114 translates pairs of consecutive measurement bits to MCS adjustment results of "−1", "0" and "1" in the differential decoding results 1110. A similar differential mechanism may be used as well for signaling MCS adjustments in the DL.

In some embodiments, instead of quantized signal quality related measurement results, a single ACK/NACK bit per CB could be reported to the eNB 1114. The eNB 1114 uses the results to adapt per-CB MCS selection based on the block error rates measured for each CB.

In another embodiment, an alternative subframe-wide MCS adjustment can be supported in addition to the intra-subframe MCS adjustment. A subframe-specific CQI value and a code block-specific differential bit map are reported by the UE 1112. A subframe-specific MCS and a one-bit adjustment indicator are configured through downlink control information, where "0" indicates that the code block-specific adjustment is not used and instead the subframe-specific MCS is applied for the entire subframe, and "1" indicates that the code block-specific adjustment provided by the UE 1112 is applied as is.

In another embodiment, a code block-specific differential bit map can be implicitly indicated by the reported code block-specific ACK/NACK. If the ACK/NACK reports for a particular code block position over multiple subframes are predominantly ACKs, then the eNB 1114 may increase the MCS. If the ACK/NACK reports for a particular code block position over multiple subframes are mostly NACKs, then the eNB 1114 may decrease the MCS.

Figure 12:
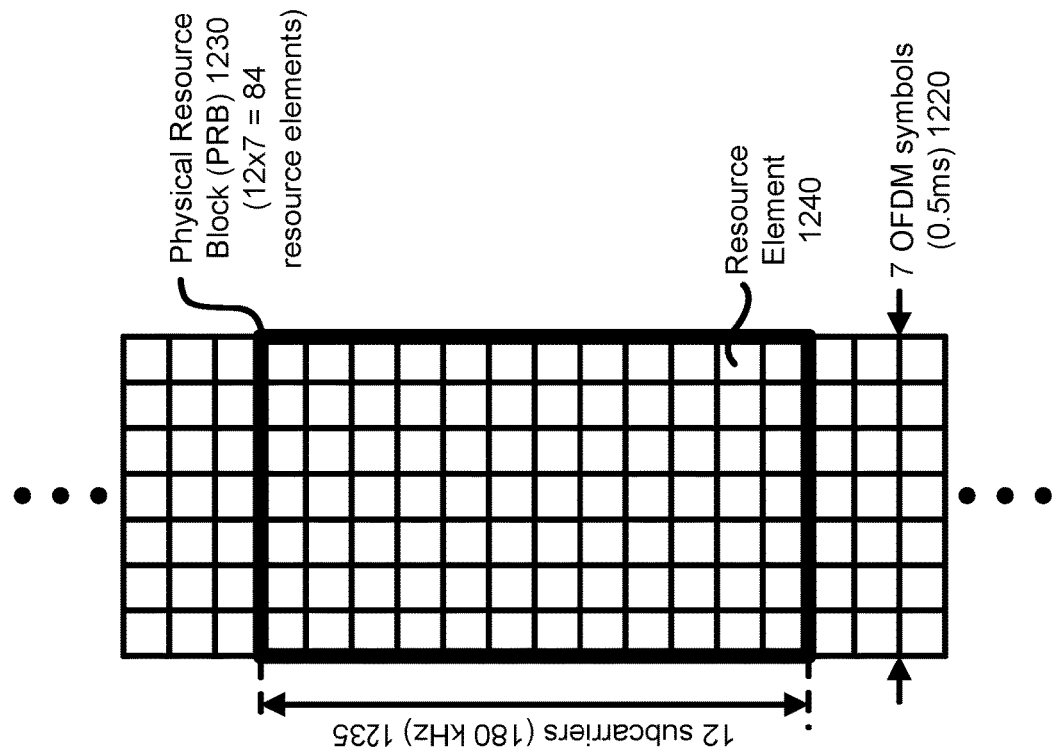
FIG. 12 is a schematic diagram illustrating the structure of a long term evolution (LTE) communication frame consistent with embodiments disclosed herein.
Figure 12:
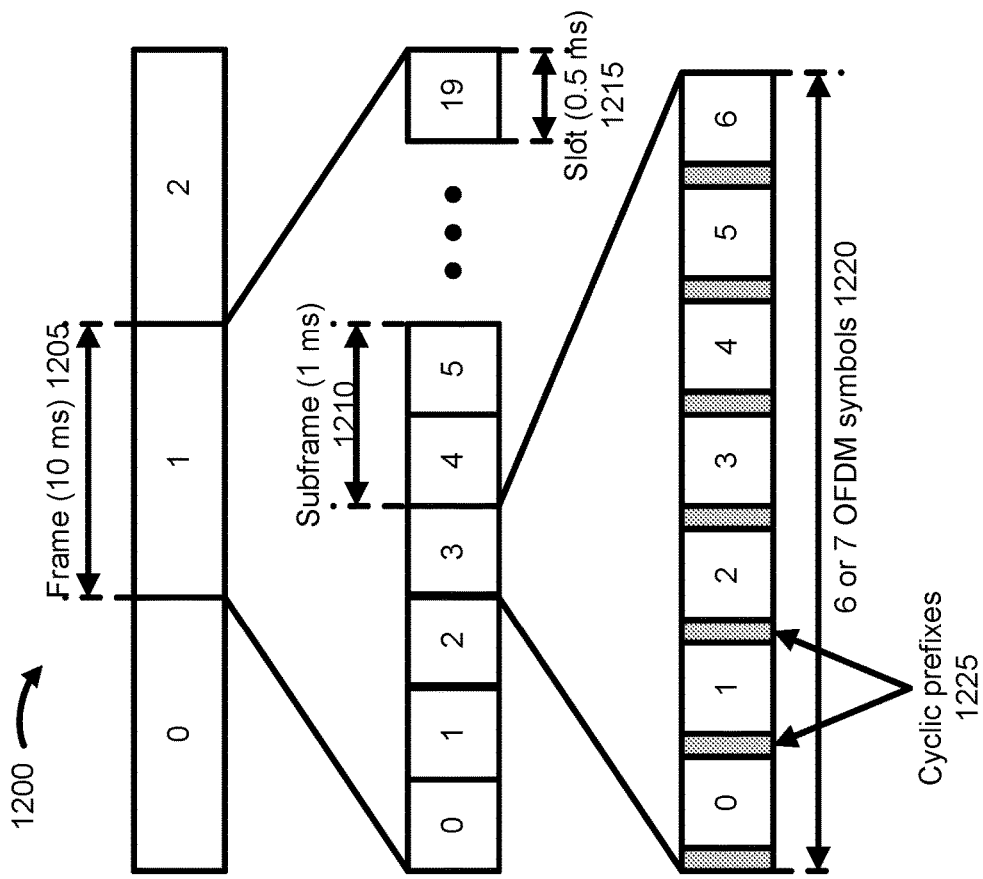

FIG. 12 is a schematic diagram 1200 illustrating the structure of an LTE communication frame 1205. The frame 1205 has a duration of 10 milliseconds (ms). The frame 1205 includes 10 subframes 1210, each having a duration of 1 ms. Each subframe 1210 includes two slots 1215, each having a duration of 0.5 ms. Therefore, the frame 1205 includes 20 slots 1215.

Each slot 1215 includes six or seven OFDM symbols 1220. The number of OFDM symbols 1220 in each slot 1215 is based on the size of the cyclic prefixes (CP) 1225. For example, the number of OFDM symbols 1220 in the slot 1215 is seven while in normal mode CP and six in extended mode CP.

The smallest allocable unit for transmission is a resource block 1230 (i.e., physical resource block (PRB) 1230). Transmissions are scheduled by the PRB 1230. The PRB 1230 consists of 12 consecutive subcarriers 1235, or 180 kHz, for the duration of one slot 1215 (0.5 ms). A resource element 1240, which is the smallest defined unit, consists of one OFDM subcarrier during one OFDM symbol interval. In the case of normal mode CP, each PRB 1230 consists of 12×7=84 resource elements 1240. Each PRB 1230 consists of 72 resource elements 1240 in the case of extended mode CP.

Figure 13:
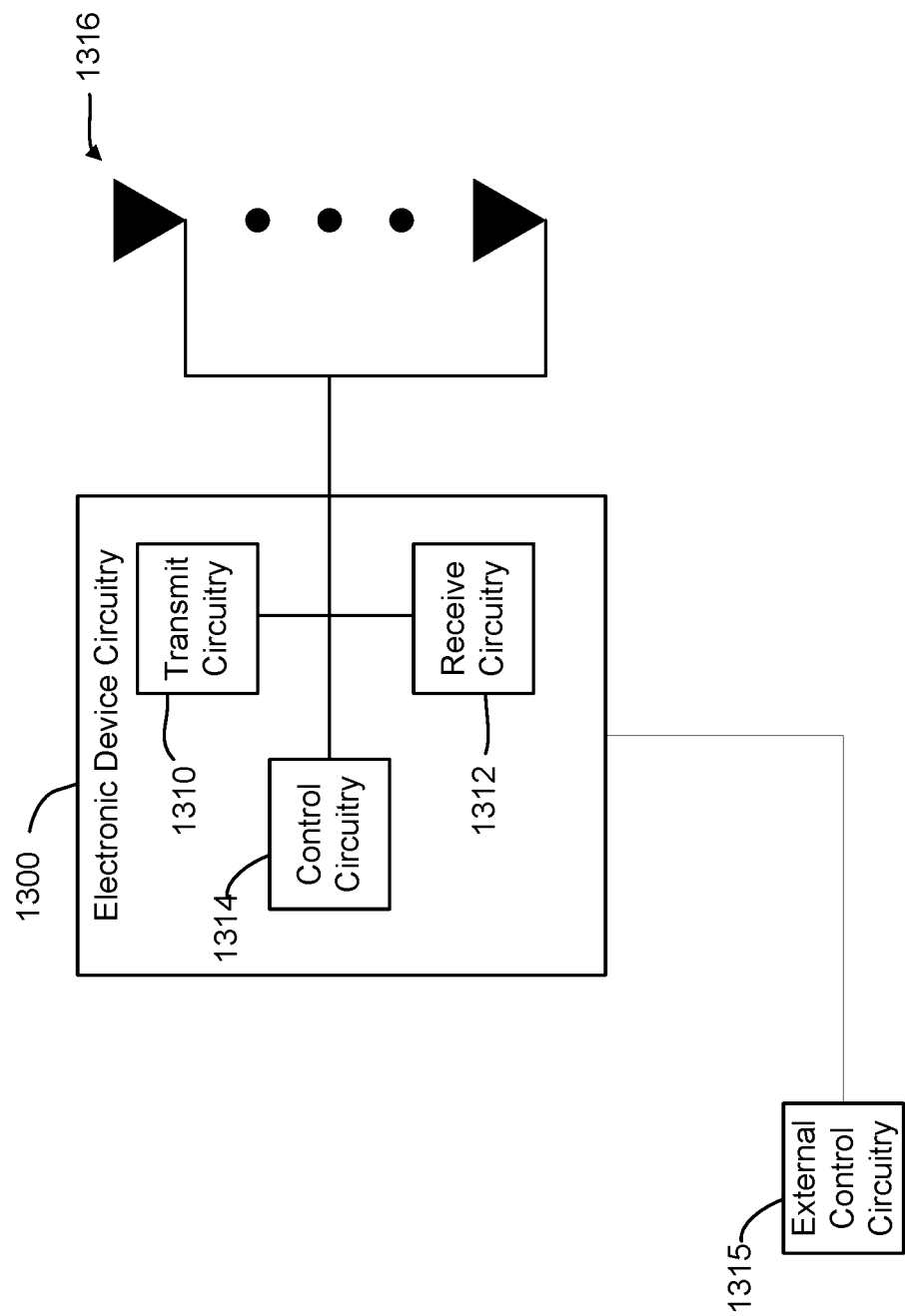
FIG. 13 is a block diagram illustrating electronic device circuitry that may be eNB circuitry, UE circuitry, network node circuitry, or some other type of circuitry consistent with embodiments disclosed herein.

FIG. 13 is a block diagram illustrating an electronic device circuitry 1300 that may be eNB circuitry, UE circuitry, network node circuitry, or some other type of circuitry in accordance with various embodiments. In embodiments, the electronic device circuitry 1300 may be, or may be incorporated into or otherwise a part of, an eNB, a UE, a mobile station (MS), a BTS, a network node, or some other type of electronic device. In embodiments, the electronic device circuitry 1300 may include a radio transmit circuitry 1310 and a receive circuitry 1312 coupled to a control circuitry 1314 (e.g., baseband processor(s), etc.). In embodiments, the transmit circuitry 1310 and/or the receive circuitry 1312 may be elements or modules of transceiver circuitry, as shown. In some embodiments, some or all of the control circuitry 1315 can be in a device separate or external from the transmit circuitry 1310 and the receive circuitry 1312 (baseband processors shared by multiple antenna devices, as in cloud-RAN (C-RAN) implementations, for example).

The electronic device circuitry 1310 may be coupled with one or more plurality of antenna elements 1316 of one or more antennas. The electronic device circuitry 1300 and/or the components of the electronic device circuitry 1300 may be configured to perform operations similar to those described elsewhere in this disclosure.

In embodiments where the electronic device circuitry 1300 is or is incorporated into or otherwise part of a UE, the transmit circuitry 1310 can transmit CBs with individual MCSs as shown in FIG. 5. The receive circuitry 1312 can measure the received code blocks and report using a low-bandwidth control signal interface as shown in FIG. 6.

In embodiments where the electronic device circuitry 1300 is an eNB, a BTS and/or a network node, or is incorporated into or is otherwise part of an eNB, a BTS and/or a network node, the transmit circuitry 1310 can transmit CBs with individual MCSs as shown in FIG. 5. The receive circuitry 1312 can measure the received code blocks and report using a low-bandwidth control signal interface as shown in FIG. 6.

In certain embodiments, the electronic device circuitry 1300 shown in FIG. 13 is operable to perform one or more methods, such as the methods shown in FIG. 1, 2 or 11.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 14:
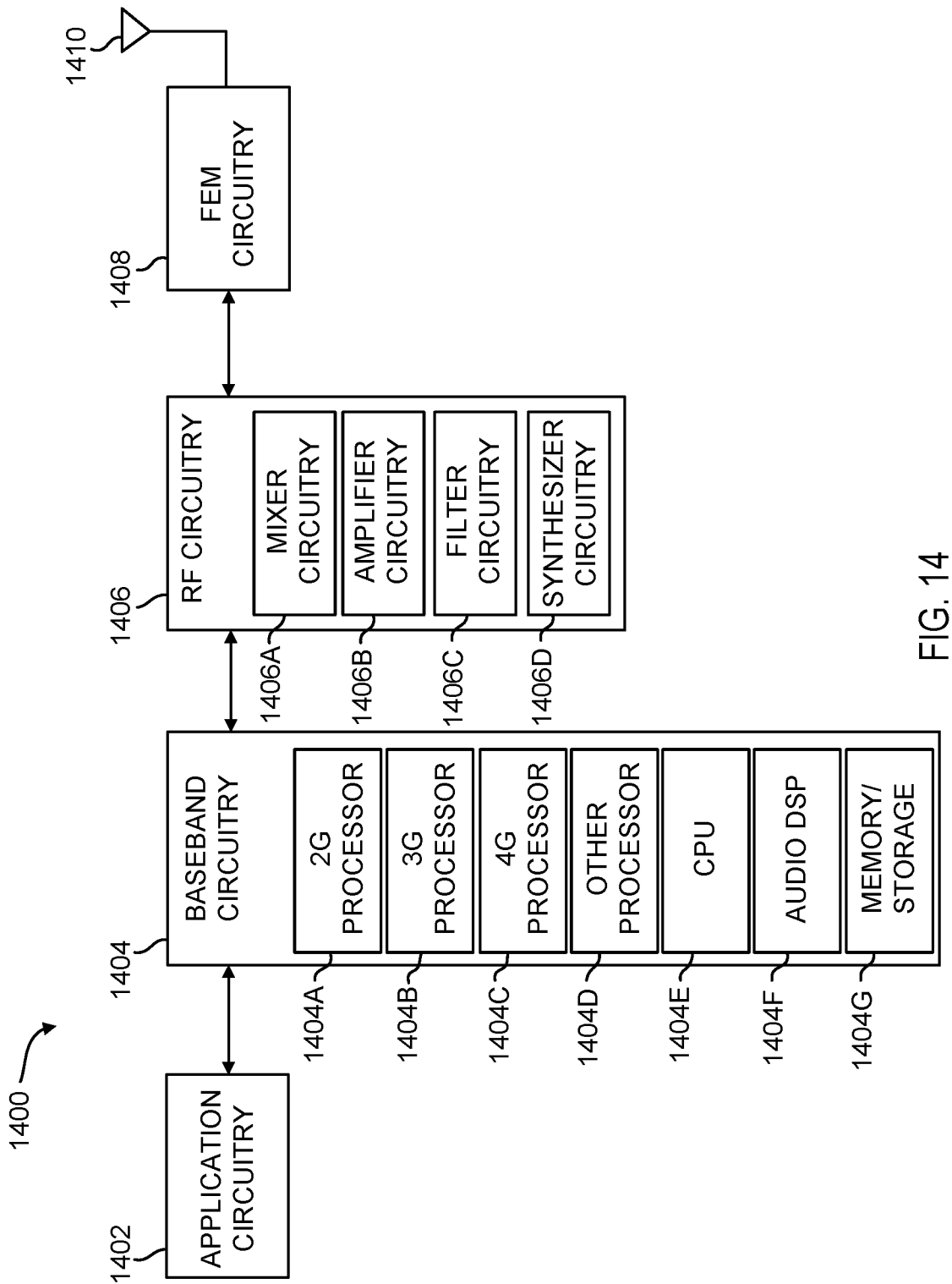
FIG. 14 is a block diagram illustrating example components of a user equipment (UE) or mobile station (MS) device consistent with embodiments disclosed herein.

Embodiments described herein may be implemented into a system using any suitably configured hardware and/or software. FIG. 14 is a block diagram illustrating, for one embodiment, example components of a user equipment (UE) or mobile station (MS) device 1400. In some embodiments, the UE device 1400 may include an application circuitry 1402, a baseband circuitry 1404, a Radio Frequency (RF) circuitry 1406, a front-end module (FEM) circuitry 1408, and one or more antennas 1410, coupled together at least as shown in FIG. 14.

The application circuitry 1402 may include one or more application processors. By way of non-limiting example, the application circuitry 1402 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1404 may include one or more single-core or multi-core processors. The baseband circuitry 1404 may include one or more baseband processors and/or control logic. The baseband circuitry 1404 may be configured to process baseband signals received from a receive signal path of the RF circuitry 1406. The baseband circuitry 1404 may also be configured to generate baseband signals for a transmit signal path of the RF circuitry 1406. The baseband circuitry 1404 may interface with the application circuitry 1402 for generation and processing of the baseband signals, and for controlling operations of the RF circuitry 1406.

By way of non-limiting example, the baseband circuitry 1404 may include at least one of a second generation (2G) baseband processor 1404A, a third generation (3G) baseband processor 1404B, a fourth generation (4G) baseband processor 1404C, other baseband processor(s) 1404D for other existing generations, and generations in development or to be developed in the future (e.g., fifth generation (5G), 6G, etc.). The baseband circuitry 1404 (e.g., at least one of baseband processors 1404A-1404D) may handle various radio control functions that enable communication with one or more radio networks via the RF circuitry 1406. By way of non-limiting example, the radio control functions may include signal modulation/demodulation, encoding/decoding, radio frequency shifting, other functions, and combinations thereof. In some embodiments, modulation/demodulation circuitry of the baseband circuitry 1404 may be programmed to perform Fast-Fourier Transform (FFT), precoding, constellation mapping/demapping functions, other functions, and combinations thereof. In some embodiments, encoding/decoding circuitry of the baseband circuitry 1404 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1404 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404E of the baseband circuitry 1404 may be programmed to run elements of the protocol stack for signaling of the PHY, MAC, RLC, PDCP and/or RRC layers. In some embodiments, the baseband circuitry 1404 may include one or more audio digital signal processor(s) (DSP) 1404F. The audio DSP(s) 1404F may include elements for compression/decompression and echo cancellation. The audio DSP(s) 1404F may also include other suitable processing elements.

The baseband circuitry 1404 may further include memory/storage 1404G. The memory/storage 1404G may include data and/or instructions for operations performed by the processors of the baseband circuitry 1404 stored thereon. In some embodiments, the memory/storage 1404G may include any combination of suitable volatile memory and/or non-volatile memory. The memory/storage 1404G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1404G may be shared among the various processors or dedicated to particular processors.

Components of the baseband circuitry 1404 may be suitably combined in a single chip, a single chipset, or disposed on a same circuit board in some embodiments. In some embodiments, some or all of the constituent components of the baseband circuitry 1404 and the application circuitry 1402 may be implemented together, such as, for example, on a system on a chip (SOC).

In some embodiments, the baseband circuitry 1404 may provide for communication compatible with one or more radio technologies. For example, in some embodiments, the baseband circuitry 1404 may support communication with an EUTRAN and/or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

The RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. The RF circuitry 1406 may include a receive signal path which may include circuitry to down-convert RF signals received from the FEM circuitry 1408, and provide baseband signals to the baseband circuitry 1404. The RF circuitry 1406 may also include a transmit signal path which may include circuitry to up-convert baseband signals provided by the baseband circuitry 1404, and provide RF output signals to the FEM circuitry 1408 for transmission.

In some embodiments, the RF circuitry 1406 may include a receive signal path and a transmit signal path. The receive signal path of the RF circuitry 1406 may include a mixer circuitry 1406A, an amplifier circuitry 1406B, and a filter circuitry 1406C. The transmit signal path of the RF circuitry 1406 may include the filter circuitry 1406C and the mixer circuitry 1406A. The RF circuitry 1406 may further include a synthesizer circuitry 1406D configured to synthesize a frequency for use by the mixer circuitry 1406A of the receive signal path and the transmit signal path. In some embodiments, the mixer circuitry 1406A of the receive signal path may be configured to down-convert RF signals received from the FEM circuitry 1408 based on the synthesized frequency provided by the synthesizer circuitry 1406D. The amplifier circuitry 1406B may be configured to amplify the down-converted signals.

The filter circuitry 1406C may include a low-pass filter or band-pass filter configured to remove unwanted signals from the down-converted signals to generate output baseband signals. Output baseband signals may be provided to the baseband circuitry 1404 for further processing. In some embodiments, the output baseband signals may include zero-frequency baseband signals, although this is not a requirement. In some embodiments, the mixer circuitry 1406A of the receive signal path may comprise passive mixers, although the scope of the embodiments is not limited in this respect.

In some embodiments, the mixer circuitry 1406A of the transmit signal path may be configured to up-convert input baseband signals based on the synthesized frequency provided by the synthesizer circuitry 1406D to generate RF output signals for the FEM circuitry 1408. The baseband signals may be provided by the baseband circuitry 1404 and may be filtered by the filter circuitry 1406C. The filter circuitry 1406C may include a low-pass filter, although the scope of the embodiments is not limited in this respect. In some embodiments, the mixer circuitry 1406A of the receive signal path and the mixer circuitry 1406A of the transmit signal path may include two or more mixers, and may be arranged for quadrature downconversion and/or upconversion, respectively. In some embodiments, the mixer circuitry 1406A of the receive signal path and the mixer circuitry 1406A of the transmit signal path may include two or more mixers and may be arranged for image rejection (e.g., Hartley image rejection). In some embodiments, the mixer circuitry 1406A of the receive signal path and the mixer circuitry 1406A may be arranged for direct downconversion and/or direct upconversion, respectively. In some embodiments, the mixer circuitry 1406A of the receive signal path and the mixer circuitry 1406A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 1406 may include analog-to-digital converter (ADC) and digital-to-analog converter (DAC) circuitry, and the baseband circuitry 1404 may include a digital baseband interface to communicate with the RF circuitry 1406.

In some dual-mode embodiments, separate radio IC circuitry may be provided for processing signals for each spectrum, although the scope of the embodiments is not limited in this respect.

In some embodiments, the synthesizer circuitry 1406D may include one or more of a fractional-N synthesizer and a fractional N/N+1 synthesizer, although the scope of the embodiments is not limited in this respect as other types of frequency synthesizers may be suitable. For example, synthesizer circuitry 1406D may include a delta-sigma synthesizer, a frequency multiplier, a synthesizer comprising a phase-locked loop with a frequency divider, other synthesizers and combinations thereof.

The synthesizer circuitry 1406D may be configured to synthesize an output frequency for use by the mixer circuitry 1406A of the RF circuitry 1406 based on a frequency input and a divider control input. In some embodiments, the synthesizer circuitry 1406D may be a fractional N/N+1 synthesizer.

In some embodiments, frequency input may be provided by a voltage controlled oscillator (VCO), although that is not a requirement. Divider control input may be provided by either the baseband circuitry 1404 or the application processor 1402 depending on the desired output frequency. In some embodiments, a divider control input (e.g., N) may be determined from a look-up table based on a channel indicated by the application processor 1402.

The synthesizer circuitry 1406D of the RF circuitry 1406 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1406D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

The FEM circuitry 1408 may include a receive signal path which may include circuitry configured to operate on RF signals received from one or more antennas 1410, amplify the received signals, and provide the amplified versions of the received signals to the RF circuitry 1406 for further processing. The FEM circuitry 1408 may also include a transmit signal path which may include circuitry configured to amplify signals for transmission provided by the RF circuitry 1406 for transmission by at least one of the one or more antennas 1410.

In some embodiments, the FEM circuitry 1408 may include a TX/RX switch configured to switch between a transmit mode and a receive mode operation. The FEM circuitry 1408 may include a receive signal path and a transmit signal path. The receive signal path of the FEM circuitry 1408 may include a low-noise amplifier (LNA) to amplify received RF signals and provide the amplified received RF signals as an output (e.g., to the RF circuitry 1406). The transmit signal path of the FEM circuitry 1408 may include a power amplifier (PA) configured to amplify input RF signals (e.g., provided by the RF circuitry 1406), and one or more filters configured to generate RF signals for subsequent transmission (e.g., by one or more of the one or more antennas 1410).

In some embodiments, the UE device 1400 may include additional elements such as, for example, memory/storage, a display, a camera, one of more sensors, an input/output (I/O) interface, other elements, and combinations thereof.

In some embodiments, the UE device 1400 may be configured to perform one or more processes, techniques, and/or methods as described herein, or portions thereof.

Figure 15:
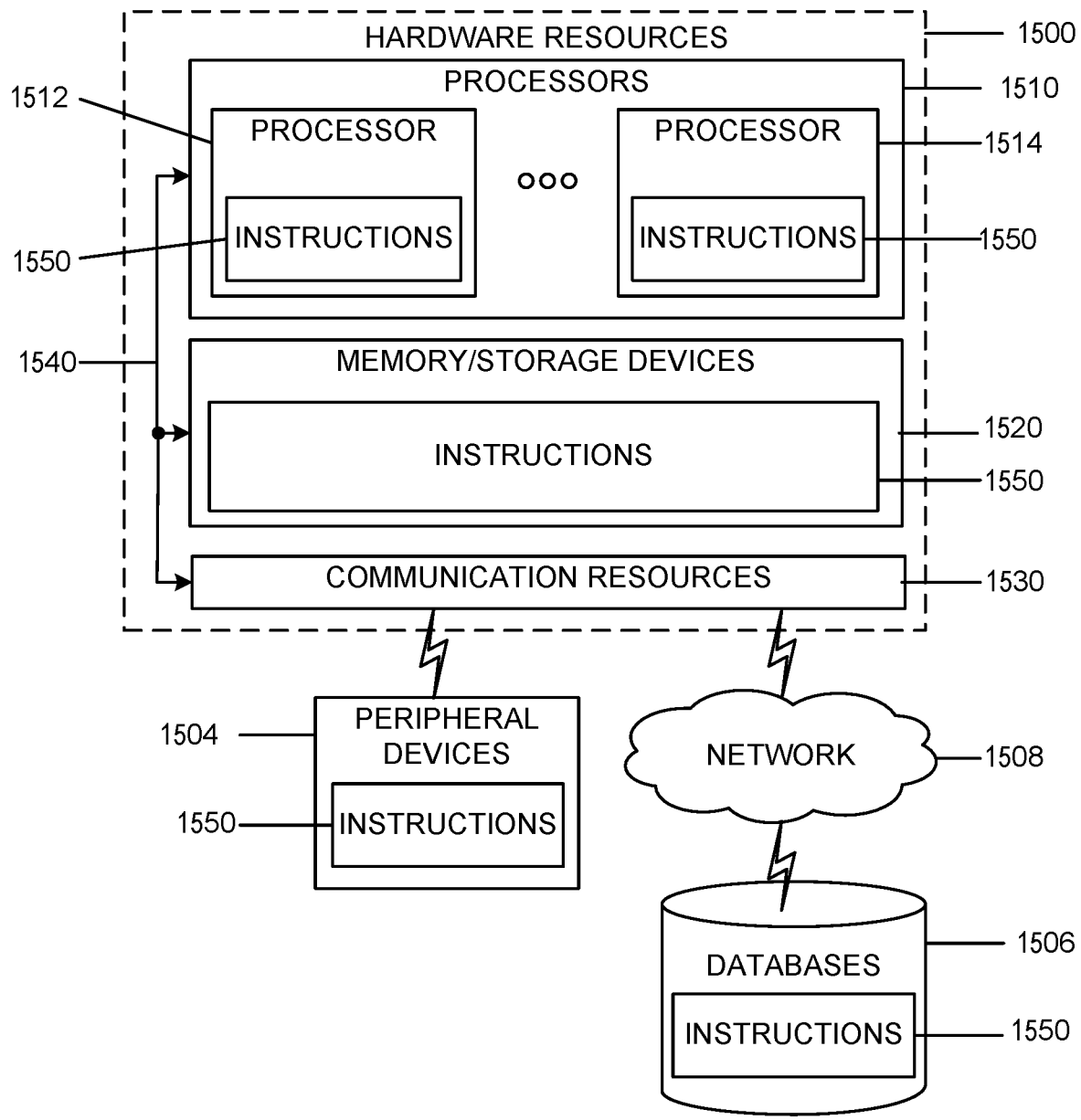
FIG. 15 is a block diagram illustrating a computing resource, including components able to read instructions from a machine-readable or computer-readable medium and perform any one or more of the methodologies discussed herein.

FIG. 15 is a block diagram illustrating components, according to some example embodiments, able to read instructions from a machine-readable or computer-readable medium (e.g., a machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which is communicatively coupled via a bus 1540.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514. The memory/storage devices 1520 may include main memory, disk storage, or any suitable combination thereof.

The communication resources 1530 may include interconnection and/or network interface components or other suitable devices to communicate with one or more peripheral devices 1504 and/or one or more databases 1506 via a network 1508. For example, the communication resources 1530 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 and/or the databases 1506. Accordingly, the memory of processors 1510, the memory/storage devices 1520, the peripheral devices 1504, and the databases 1506 are examples of computer-readable and machine-readable media.

Some examples of the above systems for dynamic HARQ size can include:

A system or a method for determining HARQ block size for a receiver and a transmitter of a data signal in a communications network, comprising: estimating an intra-subframe error fluctuation level for a received subframe; selecting a HARQ block size based on the estimate of the intra-subframe error fluctuation; determining HARQ ACK values according to the selected HARQ block size; indicating the selected HARQ block size to the transmitter of the data signal; and feeding back the HARQ ACK to the transmitter.

The system or the method of the above system can optionally include the intra-subframe error fluctuation for a received subframe modeled as a set of more than one error indicators, each of which corresponds to a distinct group of time-frequency resources within the subframe.

The system or the method of the above system can optionally include the selection of a HARQ block size, which comprises: selecting a larger HARQ block if all of the said error indicators within a subframe indicate no errors or if more than a certain number of error indicators indicate errors; and selecting a smaller HARQ block otherwise.

A system or a method for determining HARQ block size for a receiver and a transmitter of a data signal in a communications network comprises: estimating a set of more than one spectral efficiency metrics for each of more than one received subframes, wherein each of the spectral efficiency metrics corresponds to a distinct group of time-frequency resources within a subframe; determining whether the pattern of spectral efficiency metrics corresponding to a subframe changes significantly over multiple subframes; determining, if the said spectral efficiency pattern does not change significantly over multiple subframes, whether the member spectral efficiency values within a pattern exhibit sufficiently large spread; estimating, if the said spectral efficiency pattern changes significantly over multiple subframes, or if the member spectral efficiency values within a pattern does not exhibit sufficiently large spread, the intra-subframe error fluctuation level; selecting a larger HARQ block and a smaller MCS block, if the member spectral efficiency values within a pattern exhibit sufficiently large spread; and selecting a smaller HARQ block and a larger MCS block, if the estimated intra-subframe error fluctuation level is high.

The system or the method of the above system can optionally include a larger HARQ block and a larger MCS block are selected if the estimated intra-subframe error fluctuation level is low.

The system or the method of the above system can optionally include the error indicator is the error detection result of one or more code blocks.

The system or the method of the above system can optionally include the spectral efficiency metric is the mutual information, signal-to-interference-and-noise ratio, or channel quality indicator of one or more code blocks.

The system or the method of the above system can optionally include the selection of HARQ block size is based on signal allocations to the receiver and other receivers.

Some examples of the above systems for multi-MCS link adaptation can include:

A transmitter implementing a method to configure modulation constellation and/or channel coding rate per UE on a sub-TB granularity. The granularity can be with a granularity of one or multiple (OFDM) symbol(s); with a granularity of one or multiple CB(s); and/or with a frequency of once per DL TB. In some embodiments, the sub-TB granularity can be with adjustments based on a UE provided bit field as stand-alone or in combination with current link adaptation mechanism such as CSI report in LTE; with single-bit resolution per measurement unit; using tri-state "up," "down," "keep" mechanism based on differential coding as outlined above; and/or utilizing configuration of receiver side measurement types. The measurement types can be configured via higher communication layer signaling and/or from a predefined set of choices.

A receiver implementing a method to decode DL data with modulation constellation and/or channel coding rate on a sub-TB granularity and to determine measurements of DL signal quality relevant for modulation constellation and/or channel coding rate on a sub-TB granularity. The sub-TB granularity can be with a measurement unit being one or multiple OFDM symbols; with a measurement unit being one or multiple CBs; with a single-bit resolution per measurement unit; and/or being configured via higher communication layer signaling. The higher communication layer signaling can select from a predefined set of measurement types. The measurements can use measurement metrics based on mutual information and/or SINK. Alternatively, the receiver can determine and report a single ACK/NACK bit per CB.

EXAMPLES

The following examples pertain to further embodiments.

Example 1 is an apparatus of a user equipment (UE). The apparatus includes a first processing unit and a second processing unit. The first processing unit is designed to estimate an intra-subframe fluctuation level of per-code-block errors. The second processing unit is configured to map the intra-subframe fluctuation level to a hybrid automatic repeat request (HARQ) block size, determine a HARQ acknowledge (ACK) format based at least in part on the HARQ block size, indicate the selected HARQ block size to a data transmitter and generate a HARQ ACK.

Example 1.1 is the subject matter of Example 1 or any of the Examples described herein, where the first processing unit is a second generation baseband processor, a third generation baseband processor, a fourth generation baseband processor or a fifth generation baseband processor.

Example 1.2 is the subject matter of Example 1 or any of the Examples described herein, where the second processing unit is a central processing unit.

Example 2 is the subject matter of Example 1 or any of the Examples described herein, where the intra-subframe error fluctuation level for a received subframe is modeled as a set of more than one error indicators.

Example 3 is the subject matter of Example 2 or any of the Examples described herein, where each of the error indicators in the set of more than one error indicators corresponds to a distinct group of time-frequency resources within the subframe.

Example 4 is the subject matter of Example 3 or any of the Examples described herein, where the distinct group of time-frequency resources is a code block.

Example 5 is the subject matter of Example 3 or any of the Examples described herein, where the distinct group of time-frequency resources is a subframe.

Example 6 is the subject matter of Example 3 or any of the Examples described herein, where each of the error indicators in the set of more than one error indicators is a one bit value.

Example 7 is the subject matter of Example 2 or any of the Examples described herein, where mapping the intra-subframe fluctuation level to the HARQ block size further includes selecting a larger HARQ block when the error indicators within a subframe indicate no errors or when more than a certain number of error indicators indicate errors.

Example 8 is the subject matter of Example 2 or any of the Examples described herein, where mapping the intra-subframe fluctuation level to the HARQ block size further includes selecting a HARQ block size based on a clustering of errors in the set of error indicators.

Example 9 is the subject matter of Example 8 or any of the Examples described herein, where the clustering is an error cluster pattern and where the error cluster pattern is mapped to the HARQ block size.

Example 10 is the subject matter of Example 2 or any of the Examples described herein, where mapping the intra-subframe fluctuation level to the HARQ block size further includes selecting a smaller HARQ block when the error indicators within a subframe indicate a number of errors between a first threshold and a second threshold.

Example 11 is the subject matter of any of Examples 1-10 or any of the Examples described herein, where the first processing unit is a baseband processor.

Example 12 is the subject matter of any of Examples 1-10 or any of the Examples described herein, where the data transmitter is an enhanced Node B (eNB).

Example 13 is the subject matter of Example 12 or any of the Examples described herein may further include a transceiver designed to communicate with the eNB.

Example 14 is an apparatus of a user equipment (UE). The apparatus includes one or more processors. The one or more processors is designed to decode a transport block from an enhanced Node B (eNB), measure intra-transport block link quality fluctuations for code blocks within the transport block, and generate a control message indicating the link quality fluctuations for the code blocks. The transport block includes a set of code blocks, each code block using a modulation and coding scheme (MCS) indicated by the eNB, the MCS indicating a trade-off between code block data integrity and code block transmitted data rate. Generating a control message indicating the link quality fluctuations for the code blocks may also include where two sequential values of the link quality for each code block can indicate to the eNB to adjust the MCS for increased code block data integrity, and adjust the MCS to increase code block data transmitted rate or keep the MCS.

In Example 15, the subject matter of Example 14 or any of the Examples described herein may further include a low bandwidth control signaling interface designed to send the control message to the eNB.

Example 16 is the subject matter of Example 15 or any of the Examples described herein, where the low bandwidth control signaling interface is attached to a higher layer communication channel.

In Example 17, the subject matter of any of Examples 14-16 or any of the Examples described herein may further include a transceiver designed to communicate with the eNB.

Example 18 is the subject matter of any of Examples 14-16 or any of the Examples described herein, where the processor is a baseband processor.

Example 19 is a system for intra-subframe modulation and coding scheme (MCS) link adjustment of a transmitter. The system includes a processor interface attached to a transmitter designed to communicate with a receiver. The transmitter is also designed to transmit a subframe with an assigned MCS per portion of the subframe. The processor is further designed to select a measurement method from a set of configurable measurement methods for intra-subframe link quality fluctuations, which measurement method is based at least in part on link quality per portion of the subframe without reference signals. The processor is also designed to indicate the measurement method to the receiver through a control signaling interface and receive, for each reporting interval, measurement results of the intra-subframe link quality fluctuations, adjust the MCS for each portion of the subframe independently based on the measurement results to form a set of adjusted MCSs, and use the set of adjusted MCSs.

Example 20 is the subject matter of Example 19 or any of the Examples described herein, where the measurement method has a low output resolution.

Example 21 is the subject matter of Example 20 or any of the Examples described herein, where the low output resolution is one bit per portion of the subframe.

Example 22 is the subject matter of Example 19 or any of the Examples described herein, where the system is an enhanced node B (eNB).

Example 23 is the subject matter of Example 22 or any of the Examples described herein, where the receiver is a user equipment (UE).

In Example 24, the subject matter of Example 19 or any of the Examples described herein may further include an MCS adjustment engine designed to determine the adjusted MCS for each portion of the subframe and to indicate the adjusted MCS to the receiver via control signaling.

Example 25 is the subject matter of Example 24 or any of the Examples described herein, where the control signaling is downlink control signaling.

Example 26 is the subject matter of Example 24 or any of the Examples described herein, where the control signaling is uplink control signaling.

Example 27 is the subject matter of Example X or any of the Examples described herein, where the system is a user equipment (UE).

Example 28 is the subject matter of Example 19 or any of the Examples described herein, where the portion of the subframe is a codeblock (CB).

Example 29 is a system for intra-subframe modulation and coding scheme (MCS) link adjustment of a receiver. The system includes a processor interface attached to a transmitter designed to communicate with a receiver. The transmitter is designed to transmit a subframe with an assigned MCS per portion of the subframe. The processor includes a set of configurable measurement methods for intra-subframe link quality fluctuations, which measurement method is based at least in part on link quality per portion of the subframe without reference signals. The processor also uses a measurement method preconfigured by the transmitter via a control signaling interface, which determines for each reporting interval, measurement results of the intra-subframe link quality fluctuations. The processor further provides the measurement results to the transmitter to adjust the MCS for each portion of the subframe independently based on the measurement result, receive a subframe encoded with a set of adjusted MCSs, and decode each portion of a subframe based on an adjusted MCS from the set of adjusted MCSs.

Example 30 is the subject matter of Example 29 or any of the Examples described herein, where the low output resolution is one bit per portion of the subframe.

Example 31 is the subject matter of Example 29 or any of the Examples described herein, where the system is an enhanced node B (eNB).

Example 32 is the subject matter of Example 31 or any of the Examples described herein, where the transmitter is a user equipment (UE).

Example 33 is the subject matter of Example 29 or any of the Examples described herein, where the system is a user equipment (UE).

Example 34 is the subject matter of Example 29 or any of the Examples described herein, where the portion of the subframe is a codeblock (CB).

Example 35 is a method of adjusting a communication channel. The communication channel includes estimating a set of spectral efficiency metrics for a variety of received subframes over a communication channel. Each spectral efficiency metric within the set of spectral efficiency metrics corresponds to a portion of time-frequency resources within a subframe received over the communication channel. The communication channel also determines whether a pattern of spectral efficiency metrics corresponding to a subframe changes more than a first threshold over multiple subframes, when the spectral efficiency pattern does not change more than the first threshold over multiple subframes. The communication channel further determines whether spectral efficiency values within a pattern exhibit a spread exceeding a second threshold, when the spectral efficiency pattern changes more than the first threshold over multiple subframes or when the spectral efficiency values within a pattern do not exhibit a spread exceeding the second threshold. The communication channel further estimates an intra-subframe error fluctuation level, selecting a larger hybrid automatic repeat request (HARQ) block and a smaller modulation and coding scheme (MCS) block, when member spectral efficiency values within a pattern exhibit a spread exceeding the second threshold. The communication channel also selects a smaller HARQ block and a larger MCS block, when the estimated intra-subframe error fluctuation level exceeds a third threshold, and further selects a larger HARQ block and a larger MCS block, when the estimated intra-subframe error fluctuation level is below the third threshold.

Example 36 is the subject matter of Example 35 or any of the Examples described herein, where the communication channel is a long term evolution (LTE) channel.

Example 37 is the subject matter of Example 35 or any of the Examples described herein, where the larger HARQ block and the larger MCS block are selected if the estimated intra-subframe error fluctuation level is low.

Example 38 is the subject matter of Example 35 or any of the Examples described herein, where the spectral efficiency metrics include an error detection result of one or more code blocks.

Example 39 is the subject matter of Example 35 or any of the Examples described herein, where the spectral efficiency metric is the mutual information, signal-to-interference-and-noise ratio, or channel quality indicator of one or more code blocks.

Example 40 is the subject matter of Example 35 or any of the Examples described herein, where the selection of an HARQ block size is based on signal allocations to the receiver and other receivers.

Example 40.1 is an apparatus including a procedure to perform a method as identified in any of Example 35-40.

Example 40.2 is a machine-readable storage including machine-readable instructions, which when executed, implement a method or realize an apparatus as identified in any of Examples 35-40.

Example 40.3 is a machine-readable medium including code, which when executed, cause a machine to perform the method of any one of Examples 35-40.

Example 41 is a computer program product. The computer program product includes a computer-readable storage medium that stores instructions for execution by a processor to perform operations of a user equipment (UE). The operations, when executed by the processor, perform a method. The method includes decoding a transport block from an enhanced Node B (eNB). The transport block contains a set of code blocks, each code block using a modulation and coding scheme (MCS) indicated by the eNB. The MCS indicates a trade-off between code block data integrity and code block data throughput. The method also includes measuring link quality for code blocks within the transport block, and further generates a control message indicating the link quality for the code blocks, where the link quality for each code block can direct the eNB to adjust the MCS for increased code block data integrity, and adjust the MCS to increase code block data throughput or keep the MCS.

Example 42 is the subject matter of Example 41 or any of the Examples described herein, where generating a control message further includes generating a low bandwidth control signal designed to send the control message to the eNB.

Example 43 is the subject matter of Example 42 or any of the Examples described herein, where generating the low bandwidth control signal further includes transmitting the low bandwidth control signal using a higher layer communication channel.

Example 44 is the subject matter of Example 42 or any of the Examples described herein, where generating the low bandwidth control signal further includes generating two sequential values of a link quality indicator for each code block to direct to eNB to adjust the MCS for increased code block data integrity.

In Example 45, the subject matter of any of Examples 41-44 or any of the Examples described herein may further include the computer program product to provide the control message indicating the link quality to a transceiver designed to communicate with the eNB.

Example 46 is the subject matter of any of Examples 41-44 or any of the Examples described herein, where the processor is a baseband processor.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of the embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present description should, therefore, be determined by the following claims.

The invention claimed is:

1. An apparatus of a user equipment (UE), comprising:
a first processing unit configured to:
estimate an intra-subframe fluctuation level of per-codeblock errors;
a second processing unit configured to:
map the intra-subframe fluctuation level to a hybrid automatic repeat request (HARQ) block size;
determine a HARQ acknowledgement (ACK) format based at least in part on the HARQ block size;
indicate the selected HARQ block size to a data transmitter; and
generate a HARQ ACK.

2. The apparatus of claim 1, wherein the intra-subframe error fluctuation level for a received subframe is modeled as a set of more than one error indicators.

3. The apparatus of claim 2, wherein each of the error indicators in the set of more than one error indicator corresponds to a distinct group of time-frequency resources within the subframe.

4. The apparatus of claim 3, wherein the distinct group of time-frequency resources is a code block.

5. The apparatus of claim 3, wherein the distinct group of time-frequency resources is a subframe.

6. The apparatus of claim 3, wherein each of the error indicators in the set of more than one error indicator is a one bit value.

7. The apparatus of claim 2, wherein to map the intra-subframe fluctuation level to the HARQ block size further comprises selecting a larger HARQ block when the error indicators within a subframe indicate no errors or when more than a certain number of error indicators indicate errors.

8. The apparatus of claim 2, wherein to map the intra-subframe fluctuation level to the HARQ block size further comprises selecting a HARQ block size based on a clustering of errors in the set of error indicators.

9. The apparatus of claim 8, wherein the clustering is an error cluster pattern and wherein the error cluster pattern is mapped to the HARQ block size.

10. The apparatus of claim 2, wherein to map the intra-subframe fluctuation level to the HARQ block size further comprises selecting a smaller HARQ block when the error indicators within a subframe indicate a number of errors between a first threshold and a second threshold.

11. The apparatus of claim 1, wherein the first processing unit is a second generation baseband processor, a third generation baseband processor, a fourth generation baseband processor or a fifth generation baseband processor.

12. The apparatus of claim 1, wherein the second processing unit is a central processing unit.

13. The apparatus of claim 1, wherein the data transmitter is an enhanced Node B (eNB).

14. The apparatus of claim 13, further comprising a transceiver configured to communicate with the eNB.

15. A computer program product comprising a computer-readable storage medium that stores instructions for execution by a processor to perform operations of a user equipment (UE), the operations, when executed by the processor, to perform a method, the method comprising:
decoding a transport block from an enhanced Node B (eNB), the transport block comprising a set of code blocks, each code block using a modulation and coding scheme (MCS) indicated by the eNB, the MCS indicating a trade-off between code block data integrity and code block transmitted data rate;
measuring link quality for code blocks within the transport block; and
generating control data indicating the link quality for the code blocks, wherein the link quality for each code block can indicate to the eNB to adjust the MCS for increased code block data integrity, adjust the MCS to increase code block data transmitted data rate or keep the MCS.

16. The computer program product of claim 15, wherein generating the control data further comprises generating a low bandwidth control signal for transmission to the eNB.

17. The computer program product of claim 16, wherein generating the low bandwidth control signal further comprises transmitting the low bandwidth control signal using a higher layer communication channel.

18. The computer program product of claim 16, wherein generating the low bandwidth control signal further comprises generating two sequential values of a link quality indicator for each code block to indicate to the eNB to adjust the MCS for increased code block data integrity.

19. The computer program product of claim 15, further comprising providing the control data indicating the link quality to a transceiver configured to communicate with the eNB.

20. The computer program product of claim 15, wherein the processor is a baseband processor.

21. A method of adjusting a communication channel comprising:
estimating a set of spectral efficiency metrics for a plurality of received subframes over the communication channel, wherein each spectral efficiency metric within the set of spectral efficiency metrics corresponds to a portion of time-frequency resources within a subframe received over the communication channel;
determining whether a pattern of spectral efficiency metrics corresponding to a subframe changes more than a first threshold over multiple subframes;
when the spectral efficiency pattern does not change more than the first threshold over multiple subframes, determining whether spectral efficiency values within a pattern exhibit a spread exceeding a second threshold;
when the spectral efficiency pattern changes more than the first threshold over multiple subframes or when the spectral efficiency values within a pattern do not exhibit a spread exceeding the second threshold, estimating an intra-subframe error fluctuation level;
selecting a larger HARQ block and a smaller MCS block, when member spectral efficiency values within a pattern exhibit a spread exceeding the second threshold;
selecting a smaller HARQ block and a larger MCS block, when the estimated intra-subframe error fluctuation level exceeds a third threshold; and
selecting a larger HARQ block and a larger MCS block, when the estimated intra-subframe error fluctuation level is below the third threshold.

22. The method of claim 21, wherein the communication channel is a long term evolution (LTE) channel.

23. The method of claim 21, wherein the larger HARQ block and the larger MCS block are selected if the estimated intra-subframe error fluctuation level is low.

24. The method of claim 21, wherein the spectral efficiency metrics include an error detection result of one or more code blocks.

25. The method of claim 21, wherein the spectral efficiency metric is mutual information, signal-to-interference-and-noise ratio, or channel quality indicator of one or more code blocks.

26. The method of claim 21, wherein the selection of HARQ block size is based on signal allocations to a receiver of the plurality of received subframes and other receivers.

* * * * *